(12) United States Patent
Studer et al.

(10) Patent No.: US 10,817,503 B2
(45) Date of Patent: *Oct. 27, 2020

(54) SYSTEM FOR TRANSFORM GENERATION

(71) Applicant: Ab Initio Technology LLC, Lexington, MA (US)

(72) Inventors: Scott Studer, Georgetown, MA (US); Joseph Skeffington Wholey, III, Belmont, MA (US); Amit Weisman, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/626,713

(22) Filed: Jun. 19, 2017

(65) Prior Publication Data
US 2018/0067982 A1    Mar. 8, 2018

Related U.S. Application Data

(63) Continuation of application No. 13/958,037, filed on Aug. 2, 2013, now Pat. No. 9,703,822.
(Continued)

(51) Int. Cl.
*G06F 7/00* (2006.01)
*G06F 16/23* (2019.01)
(Continued)

(52) U.S. Cl.
CPC ...... *G06F 16/2365* (2019.01); *G06F 16/2453* (2019.01); *G06F 16/24534* (2019.01); *G06F 16/254* (2019.01)

(58) Field of Classification Search
CPC ............. G06F 16/2365; G06F 16/2453; G06F 16/24534; G06F 16/254
(Continued)

(56) References Cited

U.S. PATENT DOCUMENTS 5,615,359 A    3/1997    Yung
5,734,886 A    3/1998    Grosse et al.
(Continued)

FOREIGN PATENT DOCUMENTS

CN    101208695    6/2008
CN    101438280    5/2009
(Continued)

OTHER PUBLICATIONS

Supplementary European Search Report for European Application No. 13863375.5 dated Apr. 29, 2016.
(Continued)

*Primary Examiner* — Md I Uddin
(74) *Attorney, Agent, or Firm* — Wolf, Greenfield & Sacks, P.C.

(57) ABSTRACT

This specification describes technologies relating to generating transforms based on rule sets. In general, one aspect described in this specification can be embodied in methods that include receiving a rule set including execution cases, where at least one execution case in the rule set includes one or more trigger conditions and a specification of an output that is to be generated when the one or more trigger conditions are all satisfied. The methods may further include generating a control structure including a sequence of rows corresponding to one or more execution cases in the rule set. Each row may include a sequence of one or more trigger conditions and information specifying the output for a corresponding execution case. For at least one of the trigger conditions, when the trigger condition is failed, the control structure may direct processing to skip at least one row in the sequence of rows.

37 Claims, 11 Drawing Sheets

Related U.S. Application Data

(60) Provisional application No. 61/751,814, filed on Jan. 11, 2013, provisional application No. 61/735,451, filed on Dec. 10, 2012.

(51) Int. Cl.
*G06F 16/25* (2019.01)
*G06F 16/2453* (2019.01)

(58) Field of Classification Search
USPC .............................. 707/718, 752, 756, 755
See application file for complete search history.

(56) References Cited

U.S. PATENT DOCUMENTS

| | | |
|---|---|---|
| 5,832,497 A | 11/1998 | Taylor |
| 5,848,393 A | 12/1998 | Goodridge et al. |
| 5,966,072 A | 10/1999 | Stanfill et al. |
| 6,477,520 B1 | 11/2002 | Malaviya et al. |
| 6,560,592 B1 | 5/2003 | Reid et al. |
| 6,728,879 B1 | 4/2004 | Atkinson |
| 6,782,374 B2 | 8/2004 | Nichols |
| 7,020,869 B2 | 3/2006 | Abrari et al. |
| 7,164,422 B1 | 1/2007 | Wholey, III et al. |
| 7,215,637 B1 | 5/2007 | Ferguson et al. |
| 7,461,042 B2 | 12/2008 | Long et al. |
| 7,565,642 B2 | 7/2009 | Moore et al. |
| 7,756,873 B2 | 7/2010 | Gould et al. |
| 7,849,075 B2 | 12/2010 | Gould et al. |
| 8,032,501 B2 | 10/2011 | Bone et al. |
| 8,064,672 B2 | 11/2011 | Narayanan et al. |
| 8,069,129 B2 | 11/2011 | Gould et al. |
| 8,073,801 B1 | 12/2011 | von Halle et al. |
| 8,086,553 B2 | 12/2011 | Bone et al. |
| 8,122,367 B2 | 2/2012 | Krieger et al. |
| 8,190,562 B2 | 5/2012 | Sanghvi et al. |
| 8,301,413 B2 | 10/2012 | Napolin et al. |
| 8,332,740 B2 | 12/2012 | Graham |
| 8,347,207 B2 | 1/2013 | Borgsmidt et al. |
| 8,380,651 B2 | 2/2013 | Gould et al. |
| 8,386,408 B2 | 2/2013 | Gould et al. |
| 8,417,678 B2 | 4/2013 | Bone et al. |
| 8,438,533 B2 | 5/2013 | Fritzche et al. |
| 8,468,125 B2 | 6/2013 | Tarnoff et al. |
| 8,478,706 B2 | 7/2013 | Gould et al. |
| 8,571,317 B2 | 10/2013 | Welling et al. |
| 8,612,404 B2 | 12/2013 | Bone et al. |
| 8,645,434 B2 | 2/2014 | Carter et al. |
| 8,725,660 B2 | 5/2014 | Forman et al. |
| 8,897,563 B1 | 11/2014 | Welling et al. |
| 8,898,101 B2 | 11/2014 | Bone et al. |
| 9,703,822 B2 | 7/2017 | Studer et al. |
| 2003/0120593 A1 | 6/2003 | Bansal et al. |
| 2004/0034848 A1 | 2/2004 | Moore et al. |
| 2004/0085357 A1 | 5/2004 | Childress et al. |
| 2004/0088196 A1 | 5/2004 | Childress et al. |
| 2004/0210661 A1 | 10/2004 | Thompson |
| 2005/0038764 A1 | 2/2005 | Minsky et al. |
| 2005/0086360 A1 | 4/2005 | Mamou et al. |
| 2005/0246686 A1 | 11/2005 | Seshadri et al. |
| 2006/0095466 A1 | 5/2006 | Stevens et al. |
| 2006/0095832 A1 | 5/2006 | Serra et al. |
| 2006/0112061 A1 | 5/2006 | Masurkar |
| 2006/0224542 A1 | 10/2006 | Yalamanchi |
| 2006/0294150 A1 | 12/2006 | Stanfill et al. |
| 2007/0011668 A1 | 1/2007 | Wholey, III et al. |
| 2007/0021995 A1 | 1/2007 | Toklu et al. |
| 2007/0050340 A1 | 3/2007 | von Kaenel et al. |
| 2008/0059436 A1 | 3/2008 | Crocker |
| 2008/0140602 A1 | 6/2008 | Roth et al. |
| 2008/0256014 A1 | 10/2008 | Gould et al. |
| 2008/0301155 A1 | 12/2008 | Borgsmidt |
| 2009/0319832 A1 | 12/2009 | Zhang |
| 2010/0088284 A1 | 4/2010 | Cina |
| 2011/0066602 A1* | 3/2011 | Studer .................. G06F 17/2264 707/690 |
| 2012/0005144 A1 | 1/2012 | Cutler et al. |
| 2012/0059784 A1 | 3/2012 | Gould et al. |
| 2012/0066549 A1 | 3/2012 | Gould et al. |
| 2012/0324462 A1 | 12/2012 | Miljanic |
| 2014/0164410 A1 | 6/2014 | Studer et al. |

FOREIGN PATENT DOCUMENTS

| | | |
|---|---|---|
| CN | 101702942 A | 5/2010 |
| JP | H01-277939 A | 11/1989 |
| JP | H02-275539 | 11/1990 |
| JP | 04-352029 | 12/1992 |
| JP | H07036706 A | 2/1995 |
| JP | 2003-208307 | 7/2003 |
| JP | 2007-323209 A | 12/2007 |
| JP | 2008-059135 A | 3/2008 |
| JP | 2010-524134 | 7/2010 |
| KR | 2010-0015478 A | 2/2010 |
| WO | WO 01/86592 | 11/2001 |
| WO | WO 03/079217 A1 | 9/2003 |
| WO | WO 2008/124319 A1 | 10/2008 |

OTHER PUBLICATIONS

[No Author Listed], Rete algorithm. Wikipedia, the free encyclopedia. Jul. 18, 2012. https://en.wikipedia.org/w/index.php?title=Rete_algorithm&oldid=502977832 9 pages.

[No Author Listed], Shortest job next. Wikipedia, the free encyclopedia. Oct. 2, 2012. https://en.wikipedia.org/w/index.php?title=Shortest_job_next&oldid=515684118 2 pages.

De Konick et al., Join Ordering for Constraing Handling Rules. Proceedings of the Fourth Workshop on Constraint Handlind Rules. Sep. 8, 2007. 15 pages.

Chinese Office Action, with English translation, CN Application No. 200980133372.9, dated Dec. 9, 2013, 16 pages.

Chinese Office Action for Application No. 201380068894.1 dated Apr. 14, 2017.

Chinese Office Action, with English translation, CN Application No. 201380068894.1 dated Jan. 3, 2018.

International Search Report & Written Opinion in PCT application No. PCT/US09/49299 dated Aug. 12, 2009, 7 pages.

International Search Report & Written Opinion issued in PCT Application No. PCT/US10/22593, dated Mar. 12, 2010, 8 pages.

International Search Report and Written Opinion, PCT/US2014/057336, dated May 28, 2015 (10 pages).

Japanese Office Action, with English Translation, JP Application No. 2010-503118, dated Aug. 30, 2012, 8 pages.

Japanese Office Action, with English Translation, JP Application No. 2013-155253, dated Jun. 25, 2014, 5 pages.

Japanese Office Action for Japanese Application No. 2015-545913 dated Dec. 20, 2017.

U.S. Appl. No. 11/733,434, filed Jul. 31, 2013, 2 pages.
U.S. Appl. No. 12/495,316, filed Aug. 5, 2013, 3 pages.
U.S. Appl. No. 12/696,667, filed Jul. 31, 2013, 2 pages.
U.S. Appl. No. 13/295,701, filed Jul. 31, 2013, 2 pages.
U.S. Appl. No. 13/295,760, filed Jul. 31, 2013, 3 pages.
U.S. Appl. No. 13/601,416, filed Jul. 31, 2013, 1 page.
U.S. Appl. No. 13/928,475, filed Aug. 5, 2013, 1 page.

"ILog JRules: Leading the Way in Business Rule Management Systems," White Paper. !Log Business Rules, Mar. 2005, 15 pages.

Affidavit Pursuant to 37 CFR 1.56 signed by Craig W. Stanfill on Sep. 23, 2009, 2 pages.

Barakat, Nahla and Andrew P.Bradley, "Rule Extraction from Support Vector Machines: Measuring the Explanation Capability Using the Area under the ROC Curve," A.P. Pattern Recognition, pp. 8112-815 (2006).

Hamaneh et al., "Automated Removal of EKG Artifact From EEG Data Using Independent Component Analysis and Continuous Wavelet Transformation," IEEE Transactions on Biomedical Engineering, vol. 61, No. 6, pp. 1634-1641 (2014).

(56) References Cited

OTHER PUBLICATIONS

Icke, Ilknur and Andrew Rosenberg, "Automated Measures for Interpretable Dimensionality Reduction for Visual Classification: A User Study," Visual Analytics Science and Technology (VAST), pp. 281-282 (2011).
ILOG JRules Performance Analysis and Capacity Planning, ILOG Business Rules Product Management, Version 1.0, Sep. 2005, 16 pages.
ILOG, "Enrich the Decisioning of Your COBOL Applications," Jun. 2008, pp. 3-8.
Korel et al., "Data Dependence Based Testability Transformation in Automated Test Generation,"Software Reliability Engineering, 2005, ISSRE 2005, 16th IEEE International Symposium on DOI, 10 pages (2005).
Liu et al., "A Vector Operation Based Fast Association Rules Mining Algorithm," Bioinformatics, System Biology and Intelligent Computing, pp. 561-564 (2009).
Mukhopadhyay et al., "A Product Recommendation System using Vector Space Model and Association Rule", Rana Information Technology, pp. 279-282 (2008).
Owen, James. "Clash of the Java rule Titans," Info World <http://www.infoworld.com>, Jul. 17, 2006, 4 pages.
PCT International Search Report and Written Opinion dated Jul. 9, 2008. International Application No. PCT/US2008/058360, 14 pages.
Saqib et al., "Automated Optimization of Data-Path Design by Improving Circuit Area and Critical Time through Adaptive Transformation," Intelligent System and Design Applications, pp. 1493-1498 (2010).
Zhang et al., A New Association Rules Mining Algorithm Based on Vector, Genetic and Evolutionary Computing, pages 429-432 (2009).
Chinese Communication for Chinese Application No. CN201380068894.1 dated May 17, 2019.
International Search Report and Written Opinion for International Application No. PCT/US2013/073899 dated Mar. 28, 2014.
Zhang, Single-Chip Principles and Applications. Aviation Indsutry Press. Aug. 2011. 3 pages.

\* cited by examiner

FIG. 3A

| | DML Expression | Usage (rule_id, row_id, col_id) |
|---|---|---|
| 1 | in0.avg_purchases >=25000 | (1,1,1) |
| 2 | ColumnHeader24* >= 10 | (1,1,2)(1,2,2) |
| 3 | in0.avg_purchases > 5 * ( 1000 - in0.avg_balance) | (1,2,1)(1,2,1) |
| 4 | ColumnHeader24 >= 6 | (1,3,2)(1,4,2) |
| 5 | in0.avg_purchases >= 1 | (1,4,1) |
| 6 | Award_Points >= 10 | (2,1,1)(2,2,1)(2,3,1) |
| 7 | in0.card_type == "biz" | (2,1,2)(2,2,2) |
| 8 | bzt_3(in0).CENSUS2000POP) <=10000 | (2,1,3)(2,2,3) |
| 9 | in0.card_type == "amzn" | (2,3,2) |
| 10 | sql_or(sql_and((bzt_3(in0).CENSUS2000POP>=60001),(bzt_3(in0).CENSUS2000POP<=100000)),(bzt_3(in0).CENSUS2000POP>=100001))) | (2,3,3)(2,4,3)(2,5,3) |
| 11 | Award_Points >5 | (2,4,1)(2,5,1) |
| 12 | in0.card_type == "alr" | (2,4,2)(2,5,2) |

FIG. 3B

| | DML Expression | Usage (rule id, row id, col id) |
|---|---|---|
| 13 | Award_Points=in0.avg_balance / 50 + in0.avg_purchases / 250 | (1,1,3),(1,2,3) |
| 14 | Award_Points=70 | (1,3,3) |
| 15 | Award_Points=30 | (1,4,3) |
| 16 | Award_Points=0 | (1,5,3) |
| 17 | Products_Offered=vector_append(Products_Offered,"Apple iPhone"); | (2,1,4) |
| 18 | Products_Offered=vector_append(Products_Offered,"Blackberry Curve"); | (2,2,4) |
| 19 | Products_Offered=vector_append(Products_Offered,"Amazon Kindle"); | (2,3,4) |
| 20 | Products_Offered=vector_append(Products_Offered,"Portable DVD Player"); | (2,4,4) |
| 21 | Products_Offered=vector_append(Products_Offered,"Garmin Auto GPS"); | (2,5,4) |

FIG. 5

| Execution case | Triggers | Next execution case on success | Output to execute on success |
|---|---|---|---|
| ec1 | Check 1 on fail goto ec2<br>Check 2 on fail goto ec2 | ec6 | 13 |
| ec2 | Check 3 on fail goto ec4<br>Check 2 on fail goto ec3 | ec6 | 13 |
| ec3 | Check 4 on fail goto ec5 | ec6 | 14 |
| ec4 | Check 5 on fail goto ec5<br>Check 4 on fail goto ec5 | ec6 | 15 |
| ec5 |  | ec6 | 16 |
| ec6 | Check 6 on fail goto ec9<br>Check 7 on fail goto ec8<br>Check 8 on fail goto ec8 | ec7 | 17 |
| ec7 |  | ec8 | 18 |
| ec8 | Check 9 on fail goto ec9<br>Check 10 on fail goto ec9 | ec9 | 19 |
| ec9 | Check 11 on fail goto END<br>Check 9 on fail goto END<br>Check 10 on fail goto END | ec10 | 20 |
| ec10 |  | END | 21 |

SYSTEM FOR TRANSFORM GENERATION

CROSS-REFERENCE TO RELATED APPLICATIONS

This application is a continuation of and claims priority to U.S. patent application Ser. No. 13/958,037 filed on Aug. 2, 2013, entitled "SYSTEM FOR TRANSFORM GENERATION," the entire contents of which are hereby incorporated by reference, which claims priority to U.S. Provisional Application Ser. No. 61/751,814, filed on Jan. 11, 2013, entitled "SYSTEM FOR TRANSFORM GENERATION," the entire contents of which are hereby incorporated by reference, and U.S. Provisional Application Ser. No. 61/735,451, filed on Dec. 10, 2012, entitled "SYSTEM FOR TRANSFORM GENERATION," the entire contents of which are hereby incorporated by reference.

BACKGROUND

This description relates to a system for generating a transform for data based on a rule set.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. A system that implements such graph-based computations is described in U.S. Pat. No. 5,966,072, EXECUTING COMPUTATIONS EXPRESSED AS GRAPHS.

SUMMARY

In a general aspect 1, a method, performed by one or more data processing apparatus, for encoding a rule set for transforming data, is including: receiving a rule set including a sequence of execution cases, at least one execution case in the sequence of the execution cases including one or more trigger conditions and a specification of an output that is to be generated when the one or more trigger conditions are all satisfied; generating a control structure including a sequence of rows corresponding to one or more execution cases in the rule set, each row including: a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows; and storing or transmitting the control structure.

Aspect 2 according to aspect 1, further including: receiving input data; checking trigger conditions against the input data in a sequence determined using the control structure; and storing or transmitting data based on an output specified by the control structure.

Aspect 3 according to any one of aspects 1 to 2, in which at least one of the rows omits a trigger condition for the corresponding execution case, where the omitted trigger condition occurs in an execution case prior to the corresponding execution case in the sequence of execution cases.

Aspect 4 according to any one of aspects 1 to 3, in which the sequence of trigger conditions in a row is a sequence of portions of code that each direct processing to a trigger condition in a list of unique trigger conditions from the rule set.

Aspect 5 according to any one of aspects 1 to 4, in which the information specifying the output in a row is a portion of code that directs processing to an output expression in a list of unique outputs from the rule set.

Aspect 6 according to any one of aspects 1 to 5, further including: sorting the sequence of trigger conditions for a row based on a different row to which processing will be directed when a trigger condition in the sequence fails during processing of data.

Aspect 7 according to any one of aspects 1 to 6, further including: sorting the sequence of trigger conditions for a row based on execution times for the trigger conditions.

Aspect 8 according to any one of aspects 1 to 7, further including: receiving input data; checking trigger conditions against the input data in a sequence determined using the control structure; updating the execution time for a trigger condition in the list of unique trigger conditions based on the time it takes to execute the trigger condition with the input data; and sorting the pointers to trigger conditions for a row in the control structure based on the updated execution time.

Aspect 9 according to any one of aspects 1 to 8, further including: sorting the sequence of trigger conditions for a row based on failure rates for the trigger conditions.

Aspect 10 according to any one of aspects 1 to 9, further including: receiving input data; checking trigger conditions against the input data in a sequence determined using the control structure; updating the failure rate for a trigger condition in the list of unique trigger conditions based on whether the trigger condition is satisfied by a record in the input data; and sorting the pointers to trigger conditions for a row in the control structure based on the updated failure rate.

Aspect 11 according to any one of aspects 1 to 10, wherein a row of the control structure further includes a portion of code that directs processing to a different row of the control structure that is to be processed next when all of the trigger conditions for the row are satisfied.

Aspect 12 according to any one of aspects 1 to 11, wherein the rule set is specified through a graphical user interface.

Aspect 13 according to any one of aspects 1 to 12, wherein at least two trigger conditions for an execution case in the rule set are combined and represented by a single trigger condition in the control structure.

Aspect 14 according to any one of aspects 1 to 13, wherein at least two outputs for different execution cases in the rule set are combined and represented by single output expression in a row of the control structure.

Aspect 15 according to any one of aspects 1 to 14, wherein the control structure is an acyclic directed graph with nodes corresponding to the trigger conditions and output expressions in the rows of the control structure.

In a general aspect 16, a system that includes a data processing apparatus and a memory coupled to the data processing apparatus. The memory having instructions stored thereon which, when executed by the data processing apparatus cause the data processing apparatus to perform operations including receiving a rule set including a sequence of execution cases, at least one execution case in the sequence of the execution cases including one or more trigger conditions and a specification of an output that is to be generated when the one or more trigger conditions are all satisfied. The operations may further include generating a control structure including a sequence of rows corresponding to one or more execution cases in the rule set, each row including a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The operations may further include storing or transmitting the control structure.

Aspect 17 according to aspect 16, the operations further including: receiving input data; checking trigger conditions against the input data in a sequence determined using the control structure; and storing or transmitting data based on an output specified by the control structure.

Aspect 18 according to any one of aspects 16 to 17, in which at least one of the rows omits a trigger condition for the corresponding execution case, where the omitted trigger condition occurs in an execution case prior to the corresponding execution case in the sequence of execution cases.

Aspect 19 according to any one of aspects 16 to 18, in which the sequence of trigger conditions in a row is a sequence of portions of code that each direct processing to a trigger condition in a list of unique trigger conditions from the rule set.

Aspect 20 according to any one of aspects 16 to 19, in which the information specifying the output in a row is a portion of code that directs processing to an output expression in a list of unique outputs from the rule set.

Aspect 21 according to any one of aspects 16 to 20, the operations further including: sorting the sequence of trigger conditions for a row based on a different row to which processing will be directed when a trigger condition in the sequence fails during processing of data.

Aspect 22 according to any one of aspects 16 to 21, the operations further including: sorting the sequence of trigger conditions for a row based on execution times for the trigger conditions.

Aspect 23 according to any one of aspects 16 to 22, the operations further including: receiving input data; checking trigger conditions against the input data in a sequence determined using the control structure; updating the execution time for a trigger condition in the list of unique trigger conditions based on the time it takes to execute the trigger condition with the input data; and sorting the pointers to trigger conditions for a row in the control structure based on the updated execution time.

Aspect 24 according to any one of aspects 16 to 23, the operations further including: sorting the sequence of trigger conditions for a row based on failure rates for the trigger conditions.

Aspect 25 according to any one of aspects 16 to 24, the operations further including: receiving input data; checking trigger conditions against the input data in a sequence determined using the control structure; updating the failure rate for a trigger condition in the list of unique trigger conditions based on whether the trigger condition is satisfied by a record in the input data; and sorting the pointers to trigger conditions for a row in the control structure based on the updated failure rate.

Aspect 26 according to any one of aspects 16 to 25, wherein a row of the control structure further includes a portion of code that directs processing to a different row of the control structure that is to be processed next when all of the trigger conditions for the row are satisfied.

Aspect 27 according to any one of aspects 16 to 26, wherein the rule set is specified through a graphical user interface.

Aspect 28 according to any one of aspects 16 to 27, wherein at least two trigger conditions for an execution case in the rule set are combined and represented by a single trigger condition in the control structure.

Aspect 29 according to any one of aspects 16 to 28, wherein at least two outputs for different execution cases in the rule set are combined and represented by single output expression in a row of the control structure.

Aspect 30 according to any one of aspects 16 to 29, wherein the control structure is an acyclic directed graph with nodes corresponding to the trigger conditions and output expressions in the rows of the control structure.

In a general aspect 31, a computer readable storage media storing software including instructions executable by a processing device that upon such execution cause the processing device to perform operations that include receiving a rule set including a sequence of execution cases, at least one execution case in the sequence of the execution cases including one or more trigger conditions and a specification of an output that is to be generated when the one or more trigger conditions are all satisfied. The operations may further include generating a control structure including a sequence of rows corresponding to one or more execution cases in the rule set, each row including a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The operations may further include storing or transmitting the control structure.

Aspect 32 according to aspect 31, the operations further including: receiving input data; checking trigger conditions against the input data in a sequence determined using the control structure; and storing or transmitting data based on an output specified by the control structure.

Aspect 33 according to any one of aspects 31 to 32, in which at least one of the rows omits a trigger condition for the corresponding execution case, where the omitted trigger condition occurs in an execution case prior to the corresponding execution case in the sequence of execution cases.

Aspect 34 according to any one of aspects 31 to 33, in which the sequence of trigger conditions in a row is a sequence of portions of code that each direct processing to a trigger condition in a list of unique trigger conditions from the rule set.

Aspect 35 according to any one of aspects 31 to 34, in which the information specifying the output in a row is a portion of code that directs processing to an output expression in a list of unique outputs from the rule set.

Aspect 36 according to any one of aspects 31 to 35, the operations further including: sorting the sequence of trigger conditions for a row based on a different row to which processing will be directed when a trigger condition in the sequence fails during processing of data.

Aspect 37 according to any one of aspects 31 to 36, the operations further including: sorting the sequence of trigger conditions for a row based on execution times for the trigger conditions.

Aspect 38 according to any one of aspects 31 to 37, the operations further including: receiving input data; checking trigger conditions against the input data in a sequence determined using the control structure; updating the execution time for a trigger condition in the list of unique trigger conditions based on the time it takes to execute the trigger condition with the input data; and sorting the pointers to trigger conditions for a row in the control structure based on the updated execution time.

Aspect 39 according to any one of aspects 31 to 38, the operations further including: sorting the sequence of trigger conditions for a row based on failure rates for the trigger conditions.

Aspect 40 according to any one of aspects 31 to 39, the operations further including: receiving input data; checking trigger conditions against the input data in a sequence determined using the control structure; updating the failure rate for a trigger condition in the list of unique trigger conditions based on whether the trigger condition is satisfied by a record in the input data; and sorting the pointers to trigger conditions for a row in the control structure based on the updated failure rate.

Aspect 41 according to any one of aspects 31 to 40, wherein a row of the control structure further includes a portion of code that directs processing to a different row of the control structure that is to be processed next when all of the trigger conditions for the row are satisfied.

Aspect 42 according to any one of aspects 31 to 41, wherein the rule set is specified through a graphical user interface.

Aspect 43 according to any one of aspects 31 to 42, wherein at least two trigger conditions for an execution case in the rule set are combined and represented by a single trigger condition in the control structure.

Aspect 44 according to any one of aspects 31 to 43, wherein at least two outputs for different execution cases in the rule set are combined and represented by single output expression in a row of the control structure.

Aspect 45 according to any one of aspects 31 to 44, wherein the control structure is an acyclic directed graph with nodes corresponding to the trigger conditions and output expressions in the rows of the control structure.

Aspect 46 according to any one of aspects 1 to 15, wherein the control structure is part of a transform that is executed on plurality of processing devices in parallel.

Aspect 47 according to any one of aspects 16 to 30, wherein the control structure is part of a transform that is executed on plurality of processing devices in parallel.

Aspect 48 according to any one of aspects 31 to 45, wherein the control structure is part of a transform that is executed on plurality of processing devices in parallel.

In one aspect, in general, a method for generating a transform based on a rule set includes receiving a rule set including a sequence of execution cases, at least one execution case in the sequence of the execution cases including one or more trigger conditions and a specification of an output that is to be generated when the one or more trigger conditions are all satisfied. The method may further include generating a control structure including a sequence of rows corresponding to one or more execution cases in the rule set, each row including a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The method may further include storing or transmitting the control structure.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving a rule set including a sequence of execution cases, at least one execution case in the sequence of the execution cases including one or more trigger conditions and a specification of an output that is to be generated when the one or more trigger conditions are all satisfied. The operations may further include generating a control structure including a sequence of rows corresponding to one or more execution cases in the rule set, each row including a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The operations may further include storing or transmitting the control structure.

In general, one aspect of the subject matter described in this specification can be embodied in a computer readable storage media storing software including instructions executable by a processing device that upon such execution cause the processing device to perform operations that include receiving a rule set including a sequence of execution cases, at least one execution case in the sequence of the execution cases including one or more trigger conditions and a specification of an output that is to be generated when the one or more trigger conditions are all satisfied. The operations may further include generating a control structure including a sequence of rows corresponding to one or more execution cases in the rule set, each row including a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The operations may further include storing or transmitting the control structure.

In general, one aspect of the subject matter described in this specification can be embodied in a system that includes an input device or port configured to receive a rule set including a sequence of execution cases, at least one execution case in the sequence of the execution cases including one or more trigger conditions and a specification of an output that is to be generated when the one or more trigger conditions are all satisfied. The system may include a means for generating a control structure including a sequence of rows corresponding to one or more execution cases in the rule set, each row including: a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The system may include a data storage system configured to store the control structure.

In general, one aspect of the subject matter described in this specification can be embodied in a system that includes an input device or port configured to receive a rule set including a sequence of execution cases, at least one execution case in the sequence of the execution cases including one or more trigger conditions and a specification of an output that is to be generated when the one or more trigger conditions are all satisfied. The system may include at least one processor configured to perform operations, the operations including generating a control structure including a sequence of rows corresponding to one or more execution cases in the rule set, each row including: a sequence of one or more trigger conditions and information specifying the output for a corresponding execution case, wherein the generated control structure is configured to, during future processing to transform input data, direct processing to continue at a different row when one of the trigger conditions is failed and wherein the generated control structure is configured such that, for at least one of the trigger conditions in the control structure, when the at least one of the trigger conditions is failed, the control structure will direct processing to skip at least one row in the sequence of rows. The system may include an output device or port configured to transmit the control structure.

Aspects can include one or more of the following features. Input data may be received and trigger conditions may be checked against the input data in a sequence determined using the control structure. Data based on an output specified by the control structure may be stored or transmitted. At least one of the rows may omit a trigger condition for the corresponding execution case, where the omitted trigger condition occurs in an execution case prior to the corresponding execution case in the sequence of execution cases. The sequence of trigger conditions in a row may be a sequence of portions of code that each direct processing to a trigger condition in a list of unique trigger conditions from the rule set. The information specifying the output in a row may be a portion of code that directs processing to an output in a list of unique outputs from the rule set. The sequence of trigger conditions for a row may be sorted based on a different row to which processing will be directed when a trigger condition in the sequence fails during processing of data. The sequence of trigger conditions for a row may be sorted based on execution times for the trigger conditions. The execution time for a trigger condition in the list of unique trigger conditions may be updated based on the time it takes to execute the trigger condition with the input data. The pointers to trigger conditions for a row in the control structure may be sorted based on the updated execution time. The sequence of trigger conditions for a row may be sorted based on failure rates for the trigger conditions. The failure rate for a trigger condition in the list of unique trigger conditions may be updated based on whether the trigger condition is satisfied by a record in the input data. The pointers to trigger conditions for a row in the control structure may be sorted based on the updated failure rate. A row of the control structure may include a portion of code that directs processing to a different row of the control structure that is to be processed next when all of the trigger conditions for the row are satisfied. The rule set may be specified through a graphical user interface. At least two trigger conditions for an execution case in the rule set may be combined and represented by a single trigger condition in the control structure. At least two outputs for different execution cases in the rule set may be combined and represented by single output in a row of the control structure. The control structure may be an acyclic directed graph with nodes corresponding to the trigger conditions and outputs in the rows of the control structure.

Aspects can include one or more of the following advantages.

Some implementations may reduce the per-record processing time for a transform based on a rule set. Some implementations may reduce compilation and start-up time for a transform based on a rule set. Some implementations may reduce memory usage during compilation for a transform based on a rule set. Some implementations may provide more efficient processing of data that represent physical entities, such as airplanes, cars, computers, buildings, or other infrastructure, among others. Some implementations may reduce a cognitive burden of a user handling huge amounts of data, e.g. a processing of the huge amount of data (e.g., millions or billions of records) may be more easily specified by the user allowing the user to understand the processing of the data more easily and thus apply the user's domain knowledge of a particular application without worrying about finding an efficient structure for a rule set specification.

Other features and advantages of the invention will become apparent from the following description, and from the claims.

DESCRIPTION OF DRAWINGS

FIG. 3A illustrates an example of a list of unique trigger conditions for a rule set.

FIG. 3B illustrates an example of a list of unique outputs for a rule set.

FIG. 5 illustrates an example control structure for a transform based on a rule set that is represented as a displayed table.

DESCRIPTION

Figure 1:
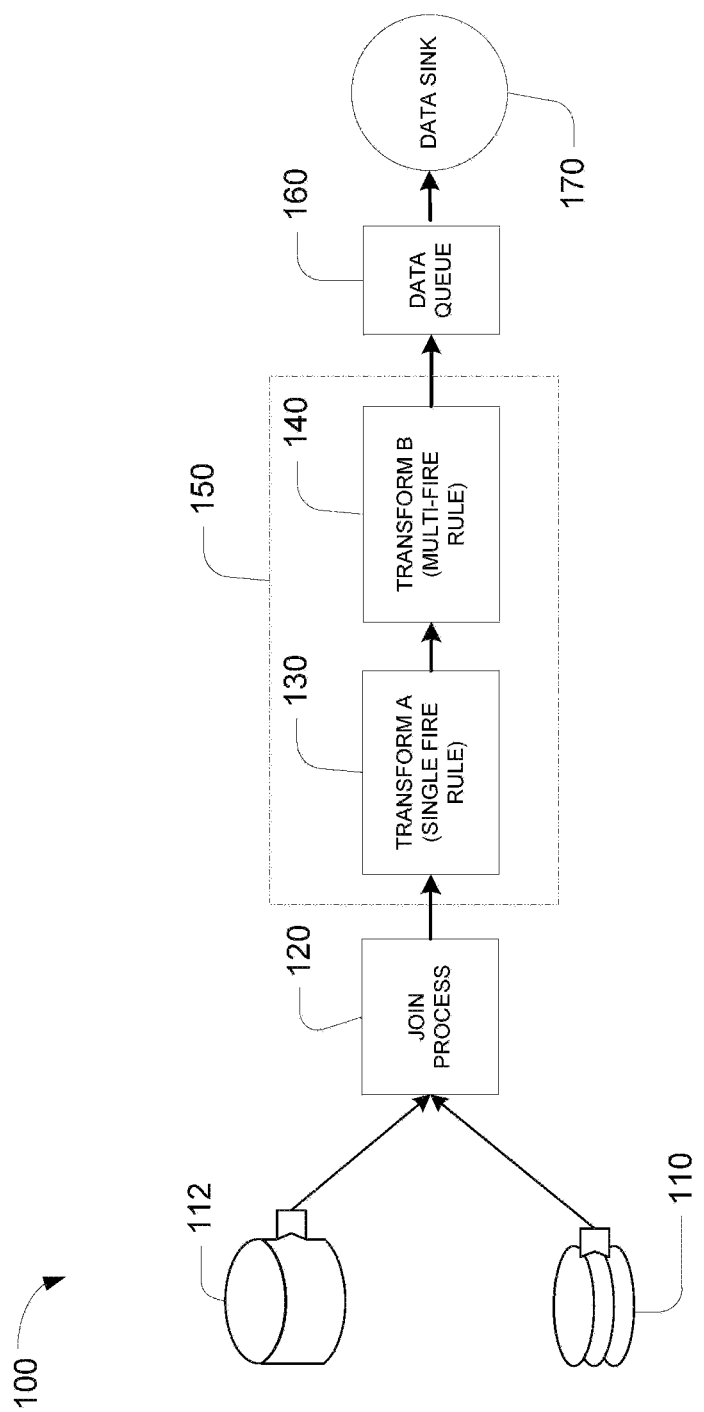
FIG. 1 is a schematic diagram of an example dataflow graph.

Graph-based computations may be used to process large sets of data. For example, a credit card issuer may use a graph-based computation to process transaction data for millions of credit cards to issue award points and select products of affiliates for presentation in offers for redemption of award points. In another example, an airline may use a graph-based computation to update frequent flier mileage accounts for millions of airline passengers. In another example, a bank may use a graph-based computation to process consumer data from a variety of sources and generate a loan approval for loans up to a maximum amount that depends on the available data for a particular consumer. In another example, an airline may use a graph-based computation to track and control maintenance of a fleet of airplanes. In another example, a rental car company may use a graph-based computation to track and control maintenance of a fleet of cars. In another example, an online service provider may use a graph-based computation to track and control maintenance and/or load balancing for one or more clusters of web servers. In another example, a city may use a graph-based computation to control road traffic signal lights based on road traffic data. In another example, a wireless network operator may use a graph-based computation to control wireless network access and bandwidth allocation for personal wireless communication devices (e.g., smartphone or tablet devices). These are just a few illustrative examples of applications for graph-based computations and many other applications are possible.

A graph-based computation may include one or more components that correspond to a transform that is applied to records (or other data elements) in a set in input data. In general, a transform processes input records to generate (e.g., create or update) one or more output records. For example, a credit card issuer may process transaction records associated with a credit card account record to generate transaction approval or denial record for a proposed credit card transaction. The details of how a transform processes input records to generate outputs records can be complex and may depend on a great deal of domain knowledge regarding a particular application. It may be useful to allow a user (e.g., an operator or developer) with little software development or coding knowledge to easily configure a transform based on their knowledge of a particular application. A system that generates efficient transforms based on rules specified through an easy to understand interface may help to reduce the cognitive load for such a user.

In some implementations, a user may be enabled to configure a potentially complex transform through a spreadsheet-based graphical user interface (GUI). For example, a user may specify a rule set that includes execution cases, by creating rows in a spread sheet-based graphical user interface for each execution case. Each execution case may include one or more conditions, called trigger conditions, that may be tested against input data and one or more outputs. When all of the trigger conditions for an execution case are satisfied by input data, the one or more outputs for that execution case may be generated. For example, trigger conditions and outputs may correspond to columns of a spreadsheet-based GUI that allows a user lacking software coding skills, but having domain knowledge and comfort with spreadsheets, to specify a rule set. In some implementations, formats other than a spreadsheet-based GUI may be used to specify a rule set (e.g., in a data manipulation language (DML)).

Once a user has specified a rule set, one or more transforms capable of processing input data records may be generated based on the rule set. The rule set may include trigger conditions and/or outputs that occur within multiple execution cases. A transform may be generated in a manner that exploits redundancy in the rule set to decreasing the memory and processing time required to compile the transform and apply it to input data records. For example, where a trigger condition occurs in multiple execution cases, the transform may skip checking the remaining execution cases with that trigger condition if the input data fails to satisfy that trigger condition. Exploiting redundancy in the rule set may allow a transform to be executed on large sets of input data while using less memory and processor cycles. A transform may be encoded in part as a control structure that controls the execution flow the transform. The control structure may include logical groupings, called rows, of trigger conditions and outputs that each correspond to an execution case from the rule set. During execution of the transform, when an evaluation of a trigger condition passes, the next trigger condition in the sequence of trigger conditions in the row is evaluated. If the last trigger condition in a row passes when evaluated with input data, then the corresponding output(s), specified at least in part by the row, are generated. If a trigger condition fails when it is evaluated with input data (e.g., the trigger condition is not satisfied), then the control structure may direct processing to a different row corresponding to a different execution case. For example, on failure of a trigger condition, execution flow may skip over a number of execution cases by jumping to begin evaluation of trigger conditions in a row that is not next on the sequence of rows within the control structure. In some implementations, the control structure references a list of unique trigger conditions and unique outputs, so that these trigger conditions and outputs only need to be stored once in the encoding of the transform(s), even where they occur many times throughout the rule set.

In some implementations trigger conditions and references to trigger conditions that occur in the specification of a rule set may be omitted from a control structure for the corresponding transform(s). For example, a trigger condition may be omitted from a row of the control structure when the same trigger condition occurs elsewhere in the rule set that will necessarily be evaluated before the current instance of the trigger condition is evaluated. Omitting trigger conditions from a row may reduce memory consumption and processing time for a corresponding transform.

In some implementations, the trigger conditions within or referenced by a row of the control structure may be sorted based on parameters of the trigger conditions. This sorting may be performed to reduce the average processing time for records to which the transform(s) are applied. For example, the sequence of trigger conditions may be sorted based on execution times of the trigger conditions, the number of rows that will be skipped if the trigger condition fails upon evaluation (e.g., jump size), or the frequency of failures for input data that has been previously processed with the transform(s). In some implementations the sequence of rows within the control structure may be sorted to increase jump sizes for trigger conditions (e.g., by grouping execution cases with common trigger conditions together). In some implementations, changing the sequence of trigger conditions within rows and/or the sequence of rows may reduce processing time required to execute a corresponding transform on a large set of data with statistics similar to the previously processed data.

In this specification, the term "rule set" refers to a collection of one or more rules, where each rule is made up of one or more execution cases. The execution cases within a rule may have an ordering, that may determine the order in which the execution cases are evaluated during processing of input data. An "execution case" is a collection of one or more trigger conditions associated with one or more outputs. A "trigger condition" is a condition that is used, together with any other trigger conditions for an execution case, to determine whether the execution case will fire. When all of the trigger conditions for an execution case are determined to be satisfied by input data, the execution case "fires," meaning the one or more outputs for the execution case are generated. An output may be static, in the sense that it is generated based on constant parameters specified as part of the rule set, or an output may be dynamic in the sense that it is generated based in part on input data values and/or intermediate result values. Rules may be single-fire or multi-fire. In a single-fire rule, only the first execution case to have all of its trigger conditions satisfied fires. In a multi-fire rule, all of the execution cases that make up the rule are checked and outputs are generated for all execution cases for which all of its respective trigger conditions are satisfied. Multiple rules in a rule set may be applied to data flows in a sequence. For example, a transform based on a first rule from a rule set may take records from multiple input data sources and generate output records. These output records may in turn be passed as input records to a second transform based on a second rule from the rule set to generate a second set of output records.

FIG. 1 shows schematic diagram of an example dataflow graph 100, including one or more transforms. Data is passed through a sequence of data processing components of dataflow graph 100 that processes a flow of data from one or more data sources to one or more data sinks. Any of the various data processing components in the dataflow graph can be implemented by processes running on separate processing devices, or multiple data processing components may be implemented by one or more processes running on a single processing device. In some implementations, the input data records may be processed continuously as they arrive (e.g., in response to a request for a credit card transaction). In some implementations, data may be processed in batches that identify a set of input data records to be processed by the dataflow graph 100.

The processing of a batch of data by the dataflow graph 100 may be initiated by user input or some other event, such as the expiration of a timer. When processing of a batch of data is started, input data records are read from one or more input data sources. For example, the input data may be read from one or more files stored on a computer-readable storage device, such as represented by data storage component 110. Input data records may also be read from a database running on a server, such as represented by data storage component 112. A join component 120 reads data (e.g., records) from multiple data sources in a sequence and arranges the input data into a sequence of discrete work units. The work units may represent records stored in a predetermined format based on input records, for example, or may represent transactions to be processed, for example. The work units (e.g., records) are passed in sequence to the next component in the dataflow graph.

The example dataflow graph 100 also includes transform components 130 and 140. The transform executed by transform component 130 is based on a single-fire rule. That is, only one execution case will fire for each work unit (e.g., record of input data from the join process). The transform component 130 generates output records that are passed to the next data processing component, in this case transform component 140.

The transform executed by transform component 140 is based on a multi-fire rule. The output data records generated by transform component 140 may include a list of outputs values corresponding to each of the execution cases that fired for an input work unit.

For example, the transform component 130 may process input data records from join process 120 corresponding to credit card transaction records from a variety of data sources. Transform component 130 may generate output records reflecting an amount of award points assigned to a credit card as a result of the transactions reflected in the records. In this example, transform component 140 may then process the award points assigned to a credit card account to generate one or more product offerings to be presented to the corresponding credit card account holder.

Transform component 130 and transform component 140 may be grouped together as a larger component 150 corresponding to a rule set including both the single-fire rule corresponding to transform component 130 and the multi-fire rule corresponding to transform component 140.

As work units make their way through the data processing components of the dataflow graph, the result output records associated with each work unit are passed to a data queue 160 where they are accumulated, before being transferred to the data sink 170. The data sink 170 can be a data storage component that stores the work units or some accumulated output based on the work units, for example, or the data sink 170 can be a queue to which the work units are published, or some other type of sink for receiving the final results. In some implementations, the batch processing ends when the results for all work units in the batch have been transferred to the data sink 170. At this point, the components in the dataflow graph may be terminated.

Figure 2A:
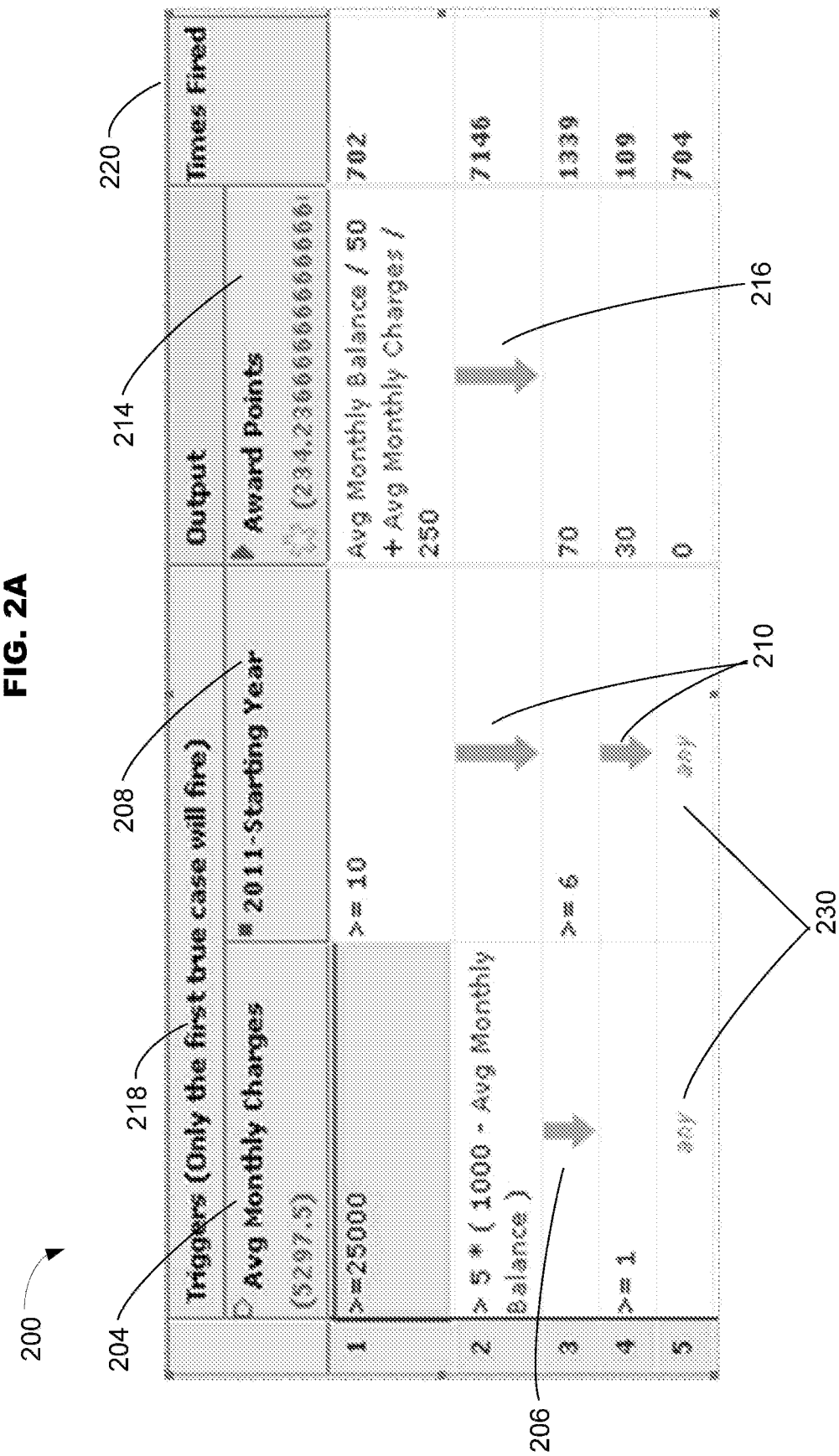
FIGS. 2A-2B are illustrations of an example graphical user interface for spreadsheet-based rule entry.

FIG. 2A is an illustration of an example GUI 200 for spreadsheet-based rule entry. GUI 200 has been configured by a user to specify a single-fire rule that determines an "award points" value for credit card accounts based on transaction data available in one or more records associate with the credit card accounts. GUI 200 includes five rows specifying five rule cases for the rule. GUI 200 is used by a user to specify trigger conditions and outputs for execution cases of the rule, and to display meta-data from a test run of a transform based on the rule that may be used by a user to facilitate debugging or tuning of the transform. For example, GUI 200 may be presented to a user through application specialist environment 622 of FIG. 6. In some implementations, a rule set specified through GUI 200 may be received through a network interface of execution environment 604 of FIG. 6.

The first column 204 specifies trigger conditions that are applied to a variable in the input data records reflecting the average monthly charges for a credit card account. The down-arrow 206 in the third row, first column indicates that the first trigger condition for the third execution case is the same as the trigger condition for the first trigger condition for the second execution case. In some implementations, a user may manually select a down-arrow icon to insert a down-arrow in one or more cells of spreadsheet-based GUI 200, thus specifying trigger conditions for the execution cases the down-arrow passes through that are the same as a trigger condition directly above the start of a down-arrow. In some implementations, the user may manually enter the same trigger condition in adjacent cells of spreadsheet-based GUI 200 and GUI 200 may automatically recognize that the trigger conditions are the same and generate the down-arrow indicating this repetition.

The second column 208 of GUI 200 specifies trigger conditions that are applied to a variable derived from the input data records for credit card accounts reflecting the number of years a credit card account has been active. Column 208 also includes two down-arrows 210 that each indicate a pair of matching trigger conditions.

The third column 214 of GUI 200 specifies outputs that are generated when all of the trigger conditions for an execution case are evaluated and found to be satisfied. Column 214 also includes a down-arrow 216 indicating that the first two execution cases have the same output. Because the user has specified through GUI 200 that this is a single-fire rule 218, the execution cases may be evaluated one at a time until one is found to fire (e.g., all of the execution cases trigger conditions are satisfied by a work unit of input data). When an execution case fires, the output specified for that execution case will be generated and the transform based on this rule will complete processing of the work unit. At this point the transform may begin processing the next work unit in a dataflow or terminate.

The last row of GUI 200 has all of its trigger condition cells set to the keyword "any" 230, which indicates there is no corresponding trigger condition or equivalently these trigger conditions always evaluate to true. Since this fifth row has no trigger conditions and is evaluated last, the corresponding output for this fifth execution case is specified as a default output.

The fourth column 220 displays meta-data from a traced test run of a transform based on the rule that may be used by a user to facilitate debugging or tuning of the rule. Generally, different transforms may be generated based on a rule set for at least three different operation modes: production mode, record test mode, and file test mode. A production mode transform implements the logic of a rule set and applies it to input data with little if any additional code. A record test mode transform is encoded to enable stepping trough the execution of the transform for individual work units (e.g., input data records representing accounts, transactions, airplanes, cars, computers, mobile devices, buildings, etc.). In addition to encoding the essential logic of a rule set, a record test mode transform may include code that generates detailed logging messages (e.g., reflecting value of each input field, output, trigger condition result (true or false), lookup key, lookup field, and which execution cases fired, as well as some intermediate parameters). A file test mode transform is encoded to enable applying the transform to a large batch of test data and reviewing a log summarizing the test results for many work units. In addition to encoding the essential logic of a rule set, a file test mode transform may include code that generates logging messages (e.g., reflecting number of times each execution case fired and/or number of times each trigger condition was evaluated, passed, and/or failed). In this example, column 220 displays counts for each execution case of the number of times that execution case fired during a run of a file test mode transform during which thousands of work units (e.g., records for credit card accounts) were processed.

Figure 2B:
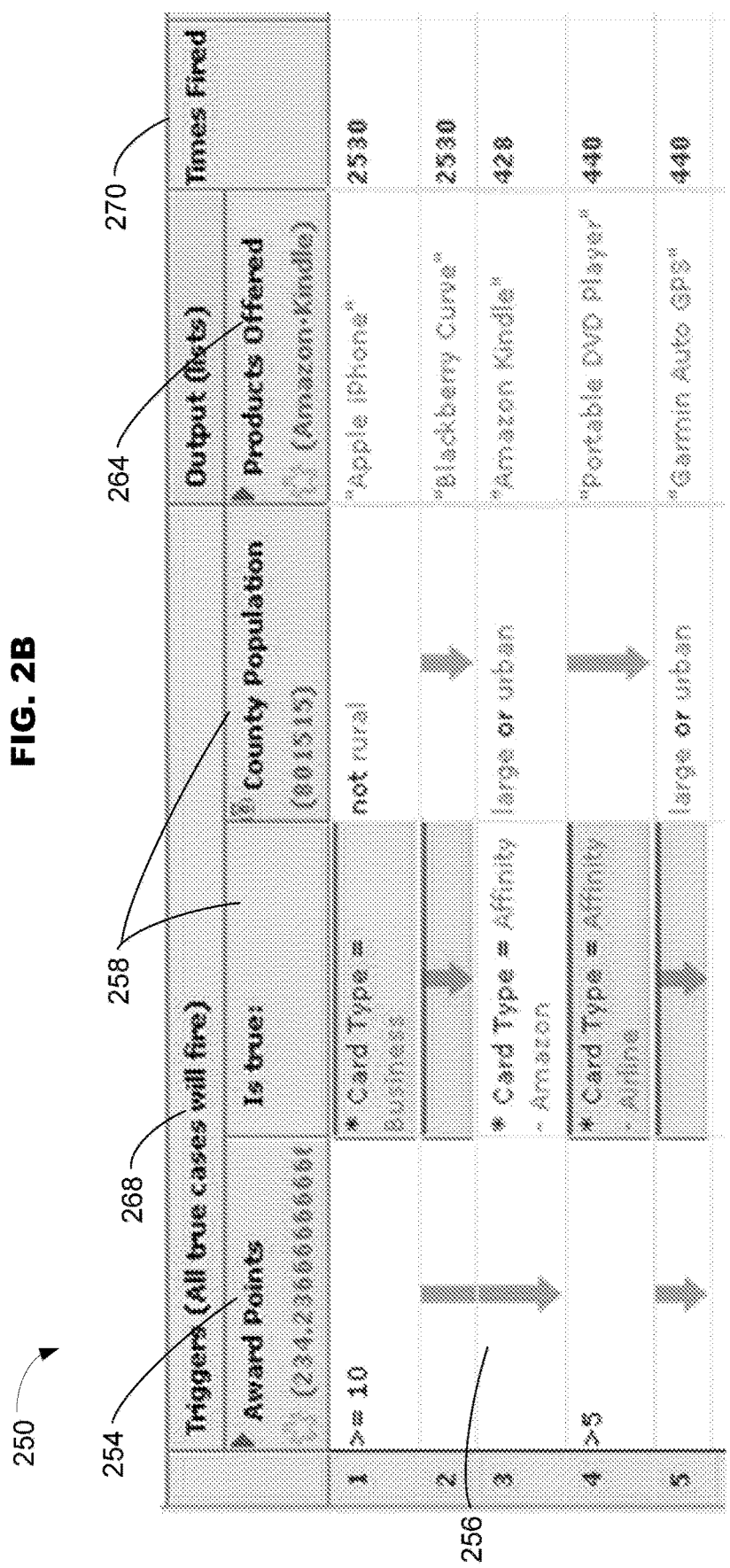

FIG. 2B is an illustration of an example GUI 250 for spreadsheet-based rule entry. GUI 250 has been configured by a user to specify a multi-fire rule that generates a list of product offerings for presentation to a credit card account holder based on an "award points" value determined using a transform based on the rule specified in the example GUI 200 of FIG. 2A and other data associated with a credit card account. GUI 250 includes five rows specifying five rule cases for the rule. GUI 250 is used by a user to specify trigger conditions and outputs for execution cases of the rule, and to display meta-data from a test run of a transform based on the rule that may be used by a user to facilitate debugging or tuning of the transform. For example, GUI 250 may be presented to a user through application specialist environment 622 of FIG. 6. In some implementations, a rule set specified through GUI 250 may be received through a network interface of execution environment 604 of FIG. 6.

The first column 254 specifies trigger conditions that are applied to a variable reflecting the "award points" for a credit card account. These "award points" values may be set and written to records in a dataflow by a transform based on the rule specified in GUI 200 of FIG. 2A. The down-arrow 256 through the second and third rows of the first column indicates that the first trigger condition for the second and third execution cases is the same as the trigger condition for the first trigger condition for the first execution case.

The second and third columns 258 of GUI 200 specify trigger conditions that are applied to other variables derived from the input data records associated with credit card accounts reflecting a type of a credit card and the population of country of residence for a holder of a credit card account. Columns 258 also include down-arrows that each indicate a pair of matching trigger conditions.

The fourth column 264 of GUI 250 specifies outputs that are generated when all of the trigger conditions for an execution case are evaluated and found to be satisfied. Because the user has specified through GUI 250 that this is a multi-fire rule 268, the execution cases may be all be evaluated. When an execution case fires, the output specified for that execution case will be generated and may be appended to a list of output values for the current work unit. When all the execution cases have been evaluated, the transform may begin processing the next work unit in a dataflow or terminate.

The fifth column 270 displays meta-data from a traced test run of a transform based on the rule that may be used by a user to facilitate debugging or tuning of the transform. In this example, column 270 displays counts for each execution case of the number of times that execution case fired during execution of a file test mode transform during which thousands of work units (e.g., records for credit card accounts) were processed.

FIG. 3A illustrates an example of a list 300 of unique trigger conditions for a rule set. In some implementations, when one or more transform(s) are generated based on a rule set, part of the transform generation process is generating a list of unique trigger conditions that may be referenced by a control structure for a transform to save memory that may otherwise be used to store duplicate copies of the trigger conditions for each execution case in which they occur. In some implementations, portions of rules, including list 300, may be generating a transform based on a rule specification may include converting names for data used by an application specialist specifying the rule to technical backend names used in a transform encoding. For example, the conversion operation may be performed based on a fixed key or other mapping of variable names. In this example, the rule set consists of the rule specified through GUI 200 of FIG. 2A (Rule 1) and the rule specified through GUI 250 of FIG. 2B (Rule 2).

The list of unique trigger conditions may include a single copy of each trigger condition that occurs in the rule set one or more times. In this example, each trigger condition is encoded as a data manipulation language (DML) expression. The DML encodings of the trigger conditions are illustrated in the first column 310 of FIG. 3A. Other encoding formats for the trigger conditions are possible (e.g., C, C++, Java, or Cobol code).

In some implementations, a list of unique trigger conditions may also include a list of usage pointers that facilitates reverse look-up of occurrences of a trigger condition in a transform. For example, the second column 320 of FIG. 3A illustrates lists of usage pointers for the rule set including Rule 1 and Rule 2. Each pointer is a triplet of numbers identifying a rule_id (Rule 1 or Rule 2), a row_id (e.g., corresponding to a particular execution case), and a column_id (e.g., corresponding to a trigger condition sequence position within the execution case). In this example, the first five unique trigger conditions occur in Rule 1 and the next seven unique trigger conditions occur in Rule 2. In some implementations, usage pointers are not included in a list of unique trigger conditions.

In some implementations, list 300 may include data structures for caching a result of complex computation specified by an expression in the list 300 so the result may be reused and re-computation of the result based on the same inputs may be avoided where the input data is recognized to be the same during execution of the transform.

The list 300 of unique trigger conditions may be stored in wide variety of formats or data structures (e.g., as a linked list or an indexed array). In this example, the list 300 of unique trigger conditions is stored as an indexed array to facilitate look-up of trigger conditions based on reference to a trigger condition by its index in a control structure for a transform.

FIG. 3B illustrates an example of a list of unique outputs for a rule set. In some implementations, when one or more transform(s) are generated based on a rule set, part of the transform generation process is generating a list of unique outputs that may be referenced by a control structure for a transform to save memory that may otherwise be used to store duplicate copies of the outputs for each execution case in which they occur. In this example, the rule set consists of Rule 1 and Rule 2.

The list of unique outputs may include a single copy of each output that occurs in the rule set one or more times. In this example, each output is encoded as a DML expression. The DML encodings of the outputs are illustrated in the first column 360 of FIG. 3B. Other encoding formats for the outputs are possible (e.g., C, C++, Java, or Cobol code).

In some implementations, a list of unique outputs may also include a list of usage pointers that facilitates reverse look-up of occurrences of an output in a transform. For example, the second column 370 of FIG. 3B illustrates lists of usage pointers for the rule set including Rule 1 and Rule 2. In this example, the first four unique outputs occur in Rule 1 and the next five unique outputs occur in Rule 2. In some implementations, usage pointers are not included in a list of unique outputs.

The list 350 of unique outputs may be stored in wide variety of formats or data structures (e.g., as a linked list or an indexed array). In this example, the list 350 of unique outputs is stored as an indexed array that is jointly indexed (e.g., in disjoint index value intervals) with the list 300 of unique trigger conditions.

Part of the transform generation process is the generation of a control structure that controls the execution flow of a transform and may reference a list of unique trigger conditions and/or a list of unique outputs. In this specification, the term "control structure" refers to a wide variety of encoding formats and is not limited to dual indexed two dimensional arrays. For example, the acyclic directed graphs of FIGS. 4A and 4B and the doubly linked list illustrated in FIG. 5 are examples of control structures that control the execution flow of a transform. A control structure has rows corresponding to execution cases. In the context of transform control structures, the term "row" refers to a logical grouping of one or more trigger conditions and one or more outputs wherein when all of the trigger conditions in the row have been determined to be satisfied, the output(s) for the row are executed. In this context the term "row" is not limited to a horizontal subset of a displayed table.

Figure 4A:
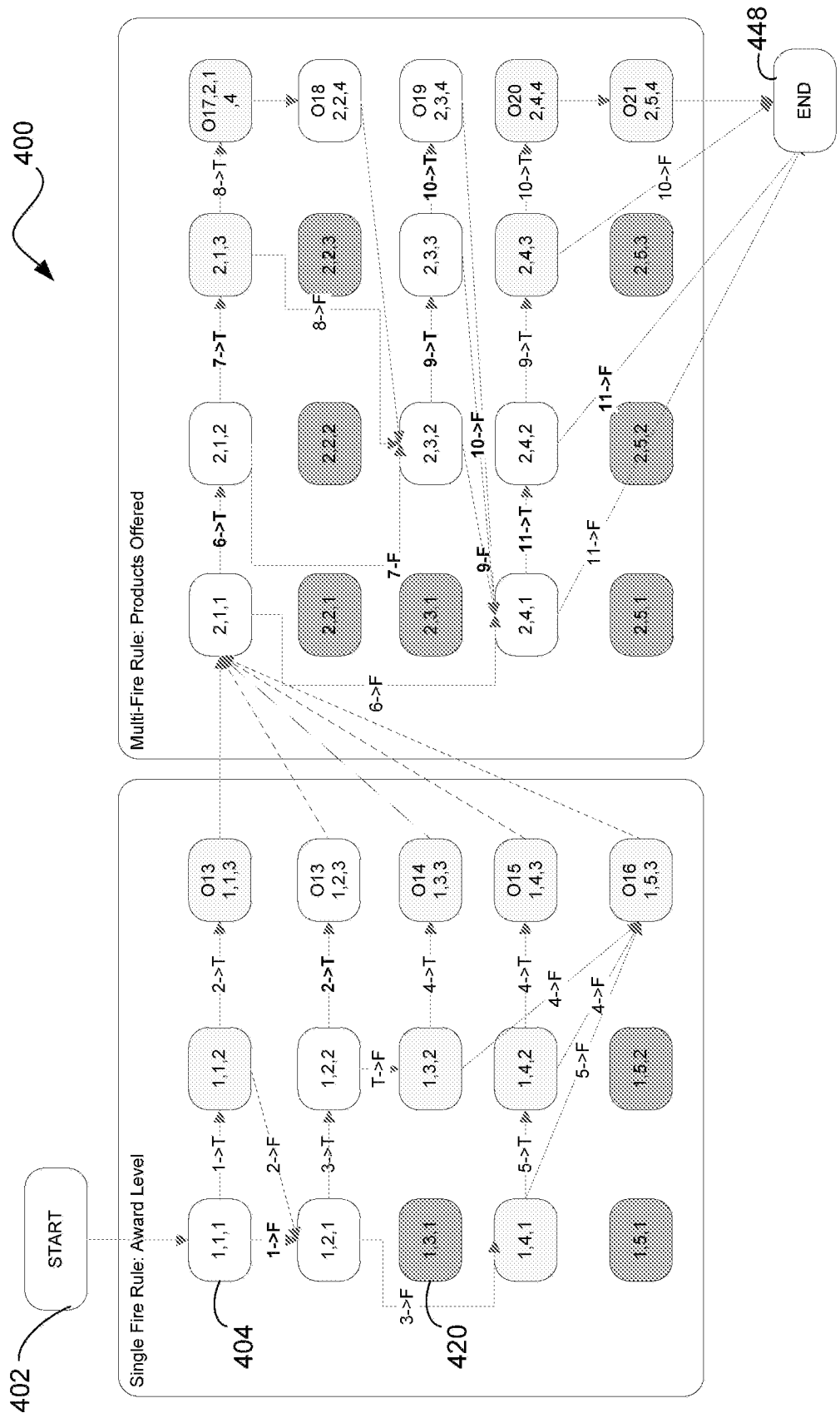
FIGS. 4A-4B illustrate an example control structure for a transform based on a rule set that is represented as an acyclic directed graph.
Figure 4B:
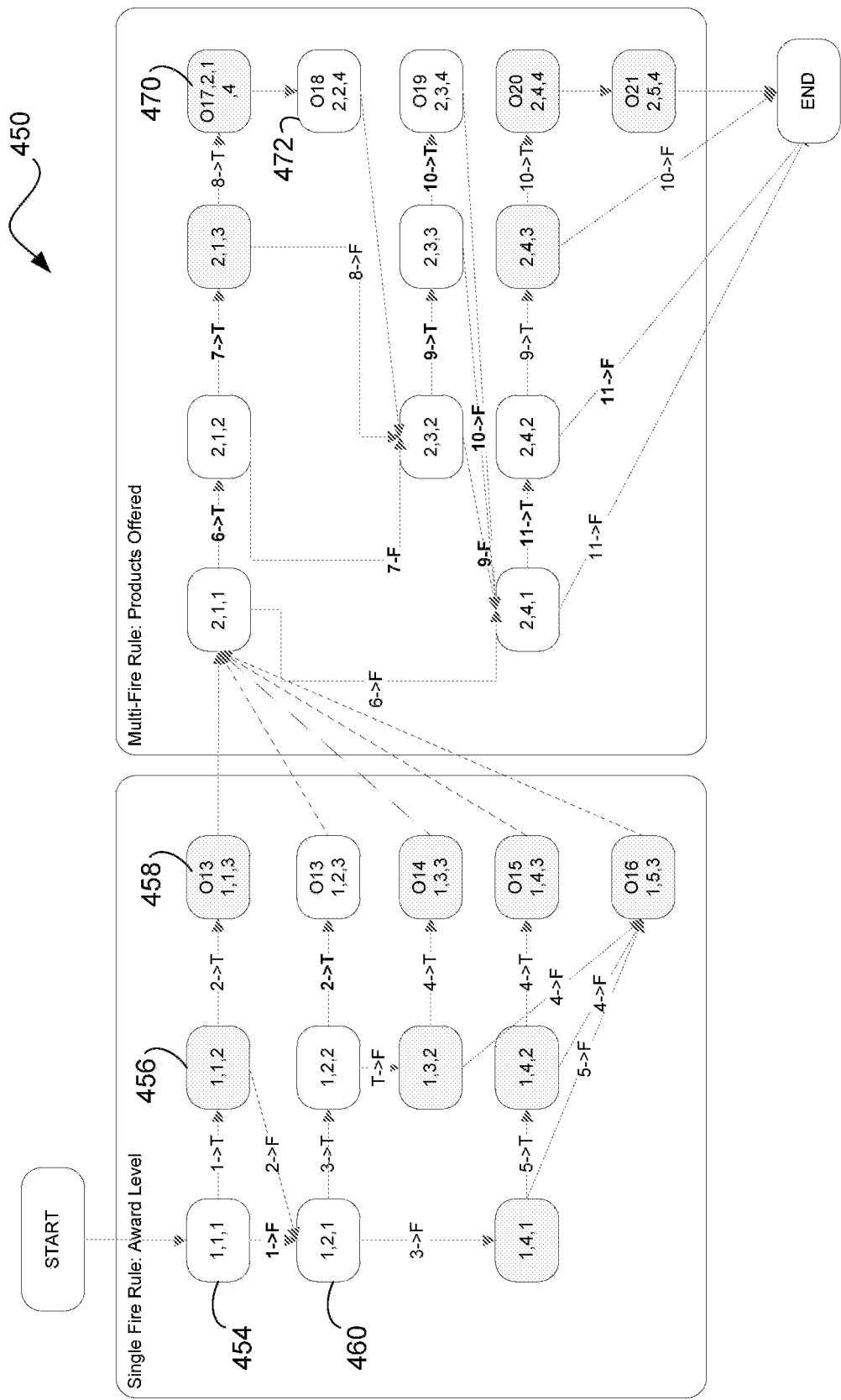

FIGS. 4A-4B illustrate an example control structure 400 for a transform based on a rule set that is represented as an acyclic directed graph. In this example, the rule set on which the transform is based includes Rule 1 and Rule 2. In this example, the transform may be implemented in component 150 of dataflow graph 100, or equivalently, the transform may be implemented as first transform based on Rule 1 implemented in component 130 in series with a second transform based on Rule 2 implemented in component 140. In FIGS. 4A and 4B, each node is labeled by a usage pointer (rule_id, row_id, column_id) as described in relation to FIG. 3A.

Nodes in the control structure 400 correspond to trigger conditions or outputs. A node corresponding to a trigger condition has two edges egressing from the node. One of these two edges is followed when the corresponding trigger condition for the nodes is determined to be true when applied to input data. The second of these two edges is followed when the corresponding trigger condition for the nodes is determined to be false when applied to input data. A node corresponding to an output has one edge egressing from the node that is always followed after the corresponding output is generated. A row in control structure 400 may include a sequence of one or more trigger condition nodes connected successively by the "true" edges egressing from the previous trigger condition node. The last trigger condition node in the sequence for a row may be connected to the first of one or more output nodes for the row by its "true" edge. The edge egressing from an output node in a row may connect to additional output nodes in the row. The edge egressing from a last output node in a row may connect to a node in another row corresponding to a different execution case or rule or may direct execution flow to the end 448 of the transform processing for a work unit. Similarly, a "false" edge egressing from a trigger condition node may connect to a node in another row corresponding to a different execution case or rule or may direct execution flow to the end 448 of the transform processing for a work unit.

The control structure 400 encodes a starting point 402 for the execution flow of the transform. The transform starts by evaluating the first trigger condition for the first execution case 404.

In some cases, a "false" edge may cause execution flow to jump to row that is not adjacent to the current row and in doing so to skip the evaluation of some execution cases. This skipping of rows may reduce the complexity and reduce the processing time for a transform as it processes units of work (e.g., corresponding to input data records which may represent accounts, transactions, airplanes, cars, computers, mobile devices, buildings, etc.).

In the example, some of the nodes, including trigger condition node 420, have no edges that connect to them. The lack of edges connecting to a node reflects the fact that the corresponding trigger condition or output will never need to be processed under the logic of the rule set that the transform is based on. As a result, these connectionless nodes and there corresponding trigger conditions may be omitted from the control structure 400. This omission of unnecessary trigger conditions is illustrated in control structure 450 of FIG. 4B.

In some cases, nodes may be combined and represented by a single node in a control structure. For example, nodes 454 and 456 may be combined by creating a single trigger condition node that directs evaluation of a logical AND of the trigger condition referenced by node 454 and the trigger condition referenced by node 456. This is possible because if both trigger conditions are true output node 458 is processed next and if either of these trigger conditions is false the trigger condition for node 460 is processed next. In this manner, two trigger conditions for an execution case in the rule set may be combined and represented by a single trigger condition in the control structure 450. If the combined nodes correspond to the only instances of these trigger conditions, then the trigger conditions may also be combined in a single entry in a list of unique trigger conditions. Similarly, output nodes 470 and 472 may be combined because there corresponding outputs are always generated together. In this example, by combining output nodes 470 and 472 their corresponding rows may be combined into a single row corresponding to two execution cases from the rule set on which the transform is based. These node combination techniques may reduce the memory usage and processing time for a transform by reducing the amount of control flow code that must be generated and executed.

FIG. 5 illustrates an example control structure 500 for a transform based on a rule set that is represented as a displayed table. Control structure 500 may be stored, for example, as doubly linked list (e.g., a linked list of rows, where each row includes a linked list of trigger conditions and outputs for the row). In this example, control structure 500 controls execution flow for a transform based on a rule set including Rule 1 and Rule 2. In this example, control structure 500 references trigger conditions in the list 300 of unique trigger conditions and outputs in the list 350 of unique outputs.

The first column 510 of FIG. 5 depicts an index for the rows of control structure 500 (e.g., an execution case number). This index may be used to reference rows in the control structure to facilitate jumps in the execution flow to avoid unnecessary processing. The second column 520 depicts a sequence of trigger conditions for each row. For example, control structure 500 may include a portion of code for a trigger condition that references the trigger condition in the list 300 of unique trigger conditions and that further directs processing of the transform after the trigger condition is evaluated based on the outcome (e.g., pass or fail/true or false). If the trigger condition fails, processing of the transform is directed to a different row that may be more than one row away from the current row in the sequence or rows in the control structure 500. For example, the portion of code 522 in the third row directs processing to evaluate the third trigger condition in the list 300 of unique trigger conditions and, if the trigger condition fails, portion of code 522 directs processing to the fifth row of the control structure 500, thus skipping over the fourth row.

If all of the trigger conditions listed for a row in the control structure are passed, then processing is directed to an output for the row. The fourth column 530 of FIG. 5 depicts references to outputs in the list 350 of unique outputs. Finally, after execution of an output for a row in the control structure 500, processing may be directed to continue in another row of the control structure 500 or to end processing for a current work item. The third column 540 of FIG. 5 depicts references to other rows in the control structure 500 that are referenced a row index for the control structure (e.g., an execution case number).

Figure 6:
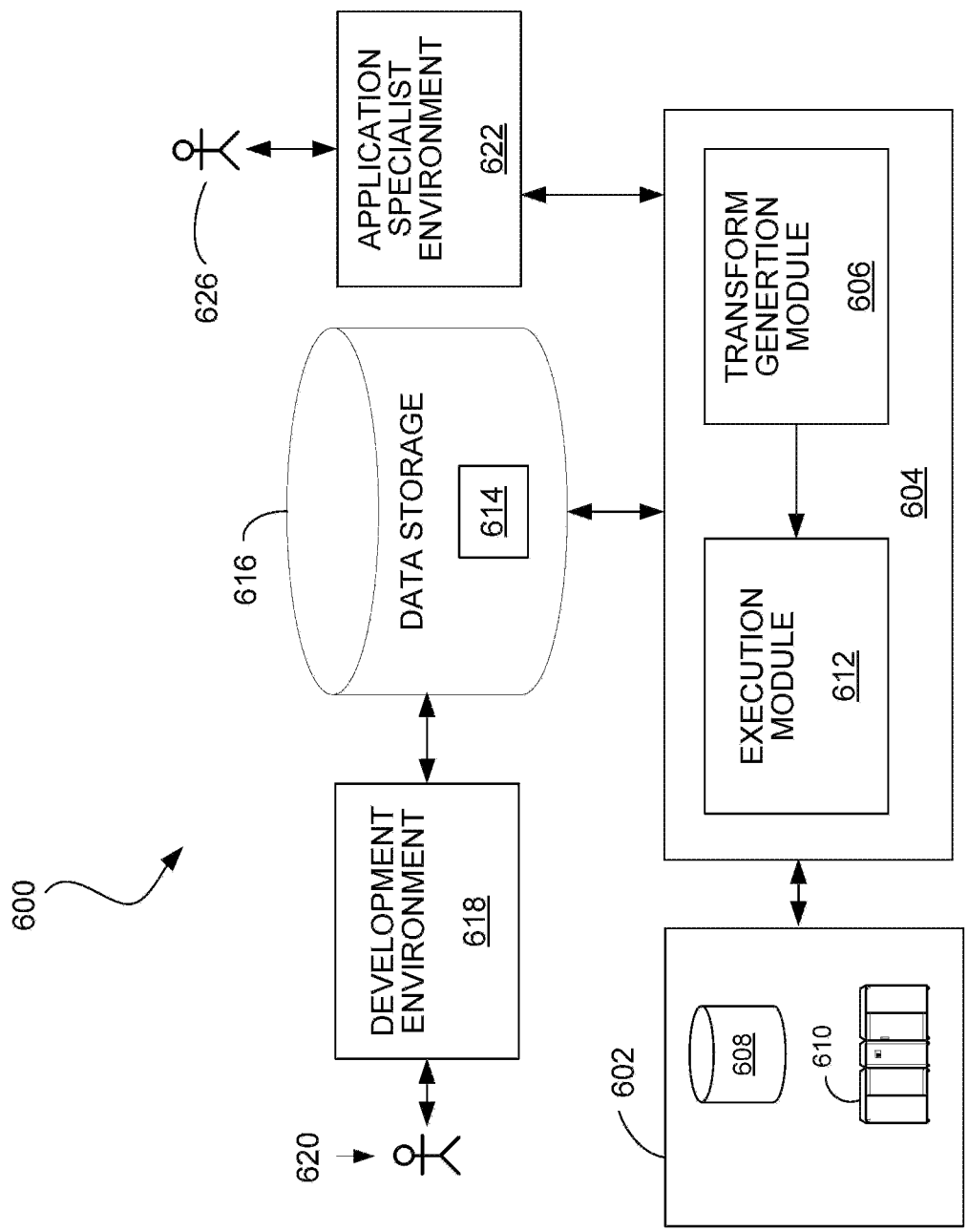
FIG. 6 is a block diagram of a system for executing graph-based computations.

FIG. 6 shows an example data processing system 600 in which the transform generation techniques can be used. The system 600 includes a data source 602 that may include one or more sources of data such as storage devices or connections to online data streams, each of which may store data in any of a variety of storage formats (e.g., database tables, spreadsheet files, flat text files, or a native format used by a mainframe). An execution environment 604 includes a transform generation module 606 and an execution module 612. The execution environment 604 may be hosted on one or more general-purpose computers under the control of a suitable operating system, such as the UNIX operating system. For example, the execution environment 604 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The transform generation module 606 receives a rule set including a sequence of execution cases, at least one of the execution cases including one or more trigger conditions and a specification of an output that is to be generated when the one or more trigger conditions are all satisfied. The rule set may also include execution cases that include one or more outputs but lack trigger conditions, or equivalently have trigger conditions that always evaluate to true (e.g., the default execution case in the Example Rule 1). For example, the rule set may be specified by a user 626 that accesses the execution environment 604 through an application specialist environment 622. In some implementations, the application specialist environment includes client software running on a remote computing device that provides the user 626 with a GUI for specifying a rule set. For example, the application specialist environment 622 may allow the user to specify the rule set in a spreadsheet-based GUI, as described in relation to FIGS. 2A and 2B. In some implementations (not shown), the development environment 618 and the application specialist environment 622 may be combined and accessible by a single user or group of users that edits both dataflow graphs and rule set specifications for transforms instantiated in those dataflow graphs.

The transform generation module 606 generates one or more transforms based on the received rule set. A control structure may be generated that controls execution flow of one or more transforms. The control structure may include a rows corresponding to execution cases in the rule set. Each row may include a sequence of one or more trigger conditions and information specifying the output for the execution case. Some of the trigger conditions may direct processing to continue at a different row that is more than one row below the current row when the trigger condition is failed during processing to transform data, thus skipping the evaluation of some execution case to reduce the required processing time for the transform.

The control structure may be stored or transmitted along with any other data encoding the generated transform(s). For example, the generated transform(s) including the control structure may be stored in the data storage system 616. In some implementations (not shown), the transform generation module 606 may be implemented as part of the application specialist environment 622 and data encoding the generated transform(s), including the control structure, may be transmitted from a remote computing device running the application specialist environment 622 to the execution environment 604.

The execution module 612 uses the one or more transforms generated by the transform generation module 606 to process input data records and generate output data records for transmission or storage. Once the one or more transforms in a graph based computation have been generated, the computation, including the transform(s) may be applied by the execution module 612 to input data. The execution module 612 reads data from the data source 602 and generates output data records 614 that may be stored in a data storage system 616 accessible to the execution environment 604. For example, data storage system 616 may include a database server and/or server running a version control application.

In some implementations, the execution module also logs executions times and/or results for trigger conditions that are evaluated during processing of input data records. For example these logs may be used by the transform generation module 606 to update a transform by changing the ordering of trigger conditions in the control structure Storage devices providing the data source 602 may be local to the execution environment 104, for example, being stored on a storage medium connected to a computer running the execution environment 604 (e.g., hard drive 608), or may be remote to the execution environment 604, for example, being hosted on a remote system (e.g., mainframe 610) in communication with a computer running the execution environment 604, over a remote connection.

The data storage system 616 is also accessible to a development environment 618 in which a developer 620 is able to create and manage graph-based computations that may include components corresponding to transforms. The operation of these transforms may be configurable by a user (e.g., user 626) who may have specialized knowledge of an application to which the graph-based computation will be applied. The development environment 618 is, in some implementations, a system for developing applications as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The execution module 612 can receive data from a variety of types of systems including different forms of database systems. The data may be organized as records having values for respective fields (also called "attributes" or "columns"), including possibly null values. When first reading data from a data source, the execution module 612 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

Figure 7:
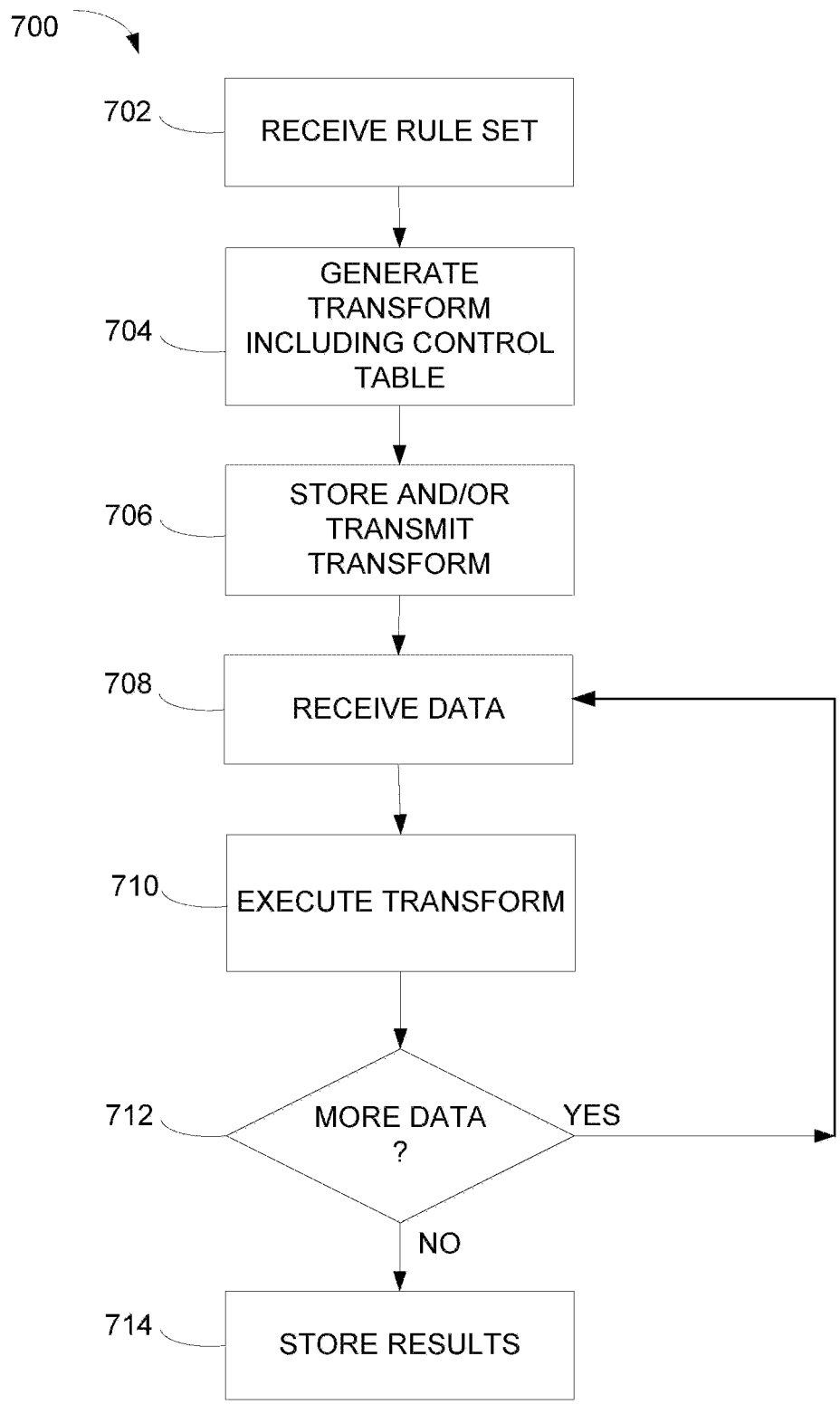
FIG. 7 is a flowchart of an example process for generating and executing a transform that is based on a rule set.

FIG. 7 shows a flowchart for an example transform generation and execution process 700. For example process 700 may be performed by the execution environment 604 of FIG. 6.

Process 700 may start when a rule set is received 702. The rule set may include a sequence of execution cases. An execution case in the rule set may include one or more trigger conditions and a specification of an output that is to be generated when the one or more trigger conditions for the execution case are all satisfied. In some implementations, the rule set is received through a user interface (e.g., a text file editor, a spreadsheet-based GUI, or some other type of GUI) including hardware that is locally connected (e.g., a computer monitor and a keyboard and/or mouse) to a processing device that receives the rule set. For example, the rule set may be received through a user interface of the execution environment 604 of FIG. 6. In some implementations, the rule set is received by a server through a network interface from a remote processing device. For example, the rule set may be received through a network interface of the execution environment 604 from remote processing device that is running an application specialist environment 622.

A transform, including a control structure, is generated 704 based on the received rule set. The control structure may be used to control the execution flow of the transform when the transform is applied to input data. A control structure may reference other portions of a generated transform (e.g., a list of unique trigger conditions and/or a list of unique outputs). A control structure may be encoded in a variety of formats. Examples of control structure formats include a executable file compiled for one or more processors in an execution environment, a text file including text that may complied by an computer language interpreter or compiler at run-time, a dual indexed (two dimensional) array of text records including portions of code that may be interpreted or compiled, the acyclic directed graphs of FIGS. 4A and 4B, and the doubly linked list illustrated in FIG. 5, among others.

The generated control structure may include rows corresponding to one or more execution cases in the rule set. A row in the control structure may include a sequence of one or more trigger conditions and information specifying the output for an execution case. A row of the control structure may be a logical grouping of execution control flow code corresponding to one or more trigger conditions and one or more outputs for an execution case in the rule set. In some implementations, a row of the control structure includes sequence (e.g., stored as a linked list) of portions of code that direct execution of the transform to cause a processing device to check a trigger condition or generate an output. A portion of code for a trigger condition may also direct execution of the transform to another portion of code corresponding to a different trigger condition or output based on the result of the evaluation of the current trigger condition. A trigger conditions in the control structure may, when it is failed during processing to transform data, direct processing to continue at a different row that is more than one row away the current row in a sequence of rows. In this manner, execution of trigger conditions and/or outputs for some rows may be skipped to reduce processing time for a work unit (e.g., an input data record).

In some implementations, a sequence of trigger conditions for a row may be sorted based on a row number of a different row to which processing will be directed when a trigger condition in the sequence fails during processing of data. For example, the sequence of trigger conditions for a row may be sorted during the transform generation process by placing trigger conditions that will cause big jumps through the control structure upon a failure condition earlier in the sequence of trigger conditions for a row, while placing trigger conditions that will cause smaller jumps through the control structure upon a failure condition later in the sequence of trigger conditions for the row.

In some implementations, a row of the control structure is generated 704 in a manner that omits a trigger condition for the corresponding execution case that also occurs in an execution case immediately prior to the corresponding execution case in the sequence of execution cases. This omission may reduce memory requirements for compiling and/or executing the transform.

In some implementations, a list of unique trigger conditions for the rule set is also generated 704 as part of the transform. List 300 of the unique trigger conditions for the rule set including Rule 1 and Rule 2 is an example of a list of unique trigger conditions that may be generated. For example, where a sequence of trigger conditions in a row is stored as a sequence of portions of code, one of the portions of code may direct processing to a trigger condition encoded in a list of unique trigger conditions from the rule set.

In some implementations, a list of unique outputs for the rule set is also generated 704 as part of the transform. List 350 of the unique outputs for the rule set including Rule 1 and Rule 2 is an example of a list of unique outputs that may be generated. For example, where an output in a row is stored as a portion of code, the portion of code may direct processing to an output in a list of unique outputs from the rule set.

In some implementations, a row of the control structure may further include a portion of code that directs processing to a different row of the control structure that is to be processed next when all of the trigger conditions for the row are satisfied and the output(s) for the row have been generated.

For example, the transform including the control structure, may be generated 704 by the transform generation module 606 running in the execution environment 604 of FIG. 6.

The generated transform, including the control structure, may be stored and/or transmitted 706. In some implementations, the transform is stored in a memory device (e.g., a random access memory) and passed to an execution module that may apply the transform to input data. For example, the transform may be stored 706 by the transform generation module 606 in a volatile memory device that is part of the execution environment 604, where it may be accessed by execution module 612 of FIG. 6. In some implementations, the transform may be stored in a data storage device including non-volatile memory (e.g., database server or server running a version control application). For example, the transform may be stored 706 in data storage system 616. In some implementations, the transform may be transmitted to remote device (e.g., through an electronic communications network). For example, the transform may be transmitted 706 from a transform generation module running in an application specialist environment to a remote execution environment for application to input data.

Once the transform has been generated and made available a processing system that will execute the transform, the transform may be applied to input data. For example the transform may be accessed by processing system running a dataflow graph including one or more components that implement the transform (e.g., components 130 and 140 of dataflow graph 100). Input data may be received 708 from one or more data sources (e.g., data source 602). In some implementations, input data is pre-processed (e.g., by component 120 implementing a join process) to create work units for a dataflow that may be passed to one or more components implementing the transform. As each work unit is prepared based on the received input data, it may be passed to the transform. In some implementations, groups of work units are passed to a transform in batches. For example, input data may be received 708 through a network interface of the execution environment 604 of FIG. 6.

The transform is executed 710 to process the received input data. In some implementations, the transform is also interpreted and/or compiled at run-time when processing new input data. For example, the transform may be executed 710 and applied to input data using a process 800 described in relation to FIG. 8. Applying the transform to the input data may include checking trigger conditions against the input data in a sequence determined using the control structure. For example, the transform may be executed 710 by execution module 606 running in execution environment 604 of FIG. 6.

Execution of the transform may continue until 712 there is no more input data available. Data reflecting results of the application of the transform to the input data may be stored 714 (e.g., as output data records that are written to a data sink). The stored results data may be have been generated based on output(s) specified by the control structure. For example, the results may be stored in by execution module 612 in data storage system 614 of FIG. 6. In some implementations (not shown), results data based on output(s) specified by the control structure is transmitted (e.g., to application specialist environment 622) over an electronic communication network (e.g., through a network interface of the execution environment 604).

Figure 8:
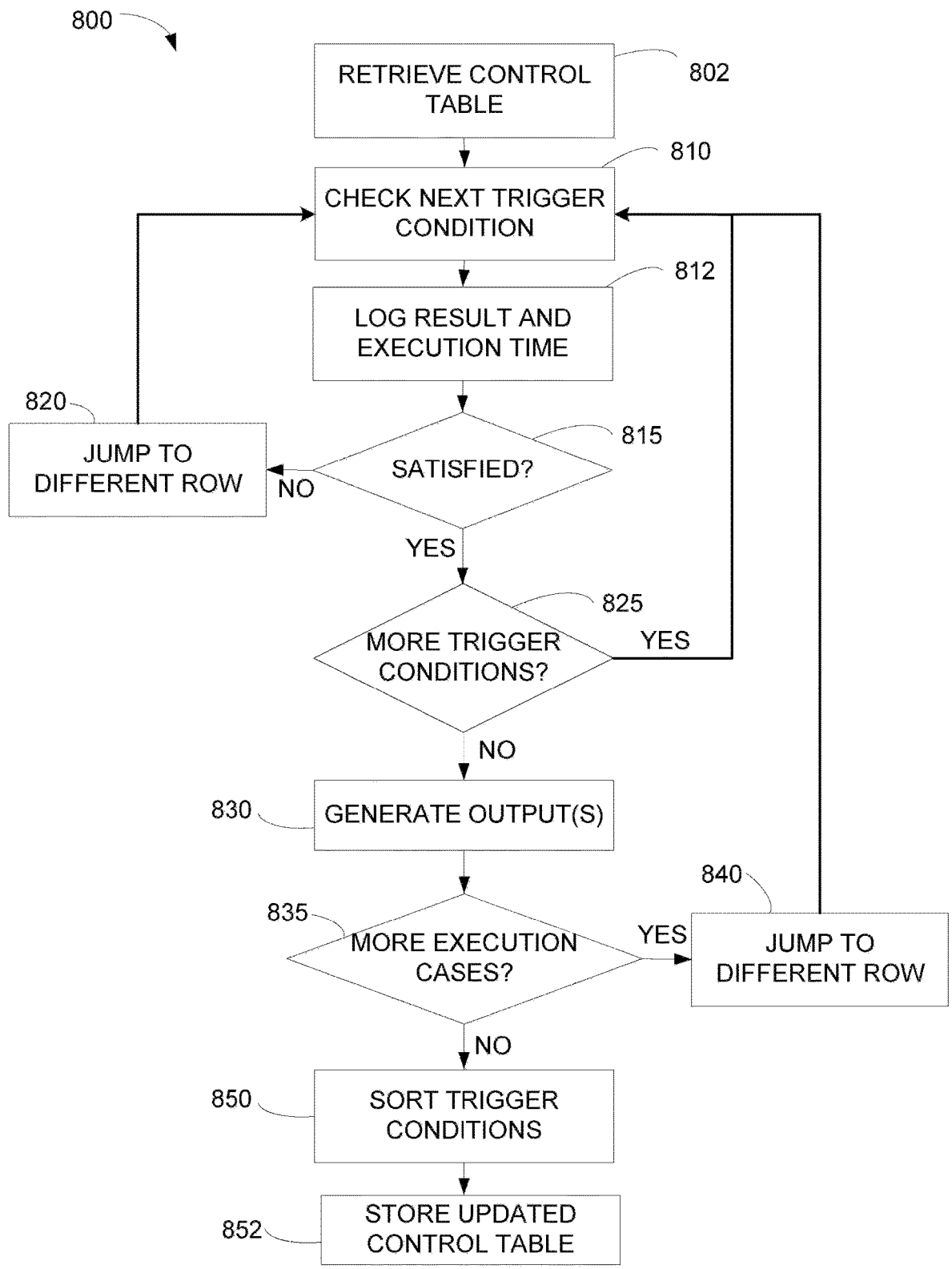
FIG. 8 is a flowchart of an example process for executing a transform that is based on a rule set.

FIG. 8 is a flowchart of an example process 800 for executing a transform that is based on a rule set. For example, process 800 may be performed by execution module 612 running on execution environment 604 of FIG. 6.

The process 800 includes retrieving 802 a control structure for the transform that will be applied to input data. In some implementations, the control structure is retrieved 802 when a component in a dataflow graph that implements the transform is passed a work unit in a dataflow. In some implementations, the control structure is retrieved 802 from a memory device (e.g., a random access memory). In some implementations, the control structure is retrieved 802 from a data storage device including non-volatile memory (e.g., database server or server running a version control application). In some implementations, the control structure is passed to an interpreter and/or compiler at run-time to prepare the control structure for execution.

The first trigger condition is checked 810 against input data for a work unit. For example, a DML expression encoding the trigger condition may be interpreted and executed to access any reference input data fields in the record(s) associated with a work unit and test the accessed data by applying logic of the trigger condition. The result of this evaluation may be pass or fail (true or false).

The result of the evaluation of the trigger condition may be logged (e.g., for testing, debugging, or optimization purposes). In some implementations, the execution time (e.g., measured in microseconds or processor cycles) for the trigger condition may be logged. Data regarding failure rates or execution times for trigger conditions when they are applied to input data may be used to dynamically update the control structure in an effort to reduced average processing time for future records.

If the trigger condition is not satisfied 815 (e.g., the result is fail or false) by the input data for the work unit, then execution of the transform may be directed to a different row of the control structure, based in part on control flow code associated with the trigger condition (e.g., a portion of code that references or includes the trigger condition). In accordance with the control structure, execution may jump 820 to a different row of the control structure. For example, some failure conditions may cause the execution to jump 820 to a different row that is more than one row away the current row in a sequence of rows for the control structure. In this manner, execution of trigger conditions and/or outputs for some rows may be skipped to reduce processing time for a work unit. The next trigger condition for the new row may then be checked 810. In some implementations (not shown), the execution of the transform may jump to a row without trigger conditions (e.g., corresponding to a default execution case) or directly to the END of the control structure.

If the trigger condition is satisfied 815 (e.g., the result is pass or true) by the input data for the work unit, then execution of the transform may be directed to the next element in the current row of the control structure. If there are more trigger conditions in the sequence of trigger conditions for the row 825, then the next trigger condition in the row is checked 810. Otherwise, one or more outputs for the row may be generated 830.

For example, a DML expression encoding an output may be interpreted and executed to access any reference input data fields in the record(s) associated with a work unit and/or apply logic of the output to generate 810 one or more output records. The resulting output record(s) may be completely new, or existing records may be updated or expanded to include additional fields or other data.

After the output(s) for the current row are generated 830, execution of the transform may be directed to a different row corresponding to additional execution case(s). In some implementations, the row includes a pointer that directs execution of the transform to a different row in the control structure. If there are more execution cases to be processed 835, then the control structure may cause execution of the transform to jump 840 to a different row in the control structure. For example, for a multi-fire rule, additional rows corresponding to additional execution cases may need to be processed. If the transform corresponds to rule set with multiple rules, then the control structure may cause execution of the transform to jump 840 to a different row in the control structure corresponding to a different rule. The next trigger condition for the new row may then be checked 810.

When no more execution cases, and thus no more rows, need to processed 835, the control structure may be dynamically updated based on log information for the processed input data. For example, trigger conditions in the sequence of trigger conditions for a row may be sorted 850 based in part on new log information about the average failure rates of execution times for the trigger conditions.

In some implementations, a measurement of the execution time for a trigger condition in a list of unique trigger conditions may be updated based on the time it takes to execute the trigger condition with the input data. The trigger conditions in the sequence of trigger conditions for a row may be sorted 850 based in part on the updated measurement of the execution times for the trigger conditions. In some implementations, a measurement of the failure rate for a trigger condition in a list of unique trigger conditions may be updated based on whether the trigger condition is satisfied by one or more record(s) in the input data. The trigger conditions in the sequence of trigger conditions for a row may be sorted 850 based in part on the updated measurement of the failure rates for the trigger conditions.

An updated version of the control structure may be stored 852 for application to future input data. In some implementations, the updated control structure may be stored 852 in a memory device (e.g., a random access memory). In some implementations, the updated control structure may be stored 852 in a data storage device including non-volatile memory (e.g., database server or server running a version control application).

The transform generation approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. It bears emphasis that the details of the particular business rules regarding credit accounts that are described in the examples of FIGS. 2A and 2B and referenced throughout this specification only to illustrate capabilities of the GUI 200 and GUI 250 and the transform generation system that they provide a user interface for. The details of the particular business rules presented are not essential features and should not be construed to limit the scope of the claims. Other embodiments are within the scope of the following claims.

What is claimed is:

1. A method of encoding a rule set for execution on a data processing system, the method comprising, with at least one computing device:
   encoding, using at least one processor, a rule set for transforming data, the rule set defining a sequence of execution cases, wherein each execution case in the sequence of the execution cases is associated with one or more trigger conditions and an output to be produced when the one or more trigger conditions for a corresponding execution case are all satisfied, said encoding comprising:
      generating a control structure, using the at least one processor, based at least in part on the rule set, the control structure specifying:
         a plurality of trigger conditions of the one or more trigger conditions associated with execution cases of the sequence of execution cases; and
         logical associations between pairs of the plurality of trigger conditions that identify which of the plurality of trigger conditions to evaluate according to a logical result of evaluating a different one of the plurality of trigger conditions on values of the data being transformed,
      wherein the control structure includes a first group of one or more trigger conditions associated with a first execution case, a second group of one or more trigger conditions associated with an execution case appearing later in the sequence of execution cases than the first execution case, and a third group of one or more trigger conditions associated with an execution case appearing later in the sequence of execution cases than the second execution case, and
      wherein the control structure includes at least one logical association between a trigger condition of the first group and a trigger condition of the third group such that the second group of one or more trigger conditions is selectively skipped depending upon values of the data being transformed;
   receiving input data; and
   checking trigger conditions of the control structure against the input data in a sequence determined using the control structure.

2. The method of claim 1, further including:
   storing and/or transmitting data based on an output specified by the control structure.

3. The method of claim 1, wherein at least one of the one or more trigger conditions associated with execution cases of the sequence of execution cases is not specified by the control structure.

4. The method of claim 1, wherein the plurality of trigger conditions specified by the control structure consist of unique trigger conditions from the rule set.

5. The method of claim 1, further including:
   determining a logical sequence of the plurality of trigger conditions of the control structure based on execution times for the trigger conditions.

6. The method of claim 1, further including:
   updating the execution time for a trigger condition in a list of unique trigger conditions based on the time it takes to execute the trigger condition with the input data; and
   sorting pointers to trigger conditions in the control structure based on the updated execution time.

7. The method of claim 1, further including:
   determining a logical sequence of the plurality of trigger conditions of the control structure based on failure rates for the trigger conditions.

8. The method of claim 1, further including:
   updating a failure rate for a trigger condition in a list of unique trigger conditions based on whether the trigger condition is satisfied by a record in the input data; and
   determining a logical sequence of the plurality of trigger conditions of the control structure based on the updated failure rate.

9. The method of claim 1, wherein the rule set is specified through a graphical user interface.

10. The method of claim 1, wherein at least two trigger conditions for an execution case in the rule set are combined and represented by a single trigger condition in the control structure.

11. The method of claim 1, wherein at least two outputs for different execution cases in the rule set are combined and represented by a single output expression in the control structure.

12. The method of claim 1, wherein the control structure is an acyclic directed graph with nodes corresponding to the plurality of trigger conditions and vertices corresponding to the logical associations between pairs of the plurality of trigger conditions.

13. A computer system comprising:
   at least one processor;
   at least one user interface device; and
   at least one computer readable medium comprising processor-executable instructions that, when executed, cause the at least one processor to:
   encode a rule set for transforming data, the rule set defining a sequence of execution cases, wherein each execution case in the sequence of the execution cases is associated with one or more trigger conditions and an output to be produced when the one or more trigger conditions for a corresponding execution case are all satisfied, said encoding comprising:
      generating a control structure, using the at least one processor, based at least in part on the rule set, the control structure specifying:
         a plurality of trigger conditions of the one or more trigger conditions associated with execution cases of the sequence of execution cases; and
         logical associations between pairs of the plurality of trigger conditions that identify which of the plurality of trigger conditions to evaluate according to a logical result of evaluating a different one of the plurality of trigger conditions on values of the data being transformed,
      wherein the control structure includes a first group of one or more trigger conditions associated with a first execution case, a second group of one or more trigger conditions associated with an execution case appearing later in the sequence of execution cases than the first execution case, and a third group of one or more trigger conditions associated with an execution case appearing later in the sequence of execution cases than the second execution case, and
      wherein the control structure includes at least one logical association between a trigger condition of the first group and a trigger condition of the third group such that whether trigger conditions of the second group of one or more trigger conditions are evaluated is selectively skipped based depending upon values of the data being transformed;
receive input data; and
check trigger conditions of the control structure against the input data in a sequence determined using the control structure.

14. The computer system of claim 13, wherein the processor-executable instructions further cause the at least one processor to:
store and/or transmit data based on an output specified by the control structure.

15. The computer system of claim 13, wherein at least one of the one or more trigger conditions associated with execution cases of the sequence of execution cases is not specified by the control structure.

16. The computer system of claim 13, wherein the plurality of trigger conditions specified by the control structure consist of unique trigger conditions from the rule set.

17. The computer system of claim 13, wherein the processor-executable instructions further cause the at least one processor to:
determining a logical sequence of the plurality of trigger conditions of the control structure based on execution times for the trigger conditions.

18. The computer system of claim 13, wherein the processor-executable instructions further cause the at least one processor to:
update the execution time for a trigger condition in a list of unique trigger conditions based on the time it takes to execute the trigger condition with the input data; and
sort pointers to trigger conditions in the control structure based on the updated execution time.

19. The computer system of claim 13, wherein at least two trigger conditions for an execution case in the rule set are combined and represented by a single trigger condition in the control structure.

20. The computer system of claim 13, wherein at least two outputs for different execution cases in the rule set are combined and represented by a single output expression in the control structure.

21. The computer system of claim 13, wherein the control structure is an acyclic directed graph with nodes corresponding to the plurality of trigger conditions and vertices corresponding to the logical associations between pairs of the plurality of trigger conditions.

22. A computer system comprising:
at least one processor;
means for encoding a rule set for transforming data, the rule set defining a sequence of execution cases, wherein each execution case in the sequence of the execution cases is associated with one or more trigger conditions and an output to be produced when the one or more trigger conditions for a corresponding execution case are all satisfied;
means for generating a control structure based at least in part on the rule set, the control structure specifying:
a plurality of trigger conditions of the one or more trigger conditions associated with execution cases of the sequence of execution cases; and
logical associations between pairs of the plurality of trigger conditions that identify which of the plurality of trigger conditions to evaluate according to a logical result of evaluating a different one of the plurality of trigger conditions on values of the data being transformed,
wherein the control structure includes a first group of one or more trigger conditions associated with a first execution case, a second group of one or more trigger conditions associated with an execution case appearing later in the sequence of execution cases than the first execution case, and a third group of one or more trigger conditions associated with an execution case appearing later in the sequence of execution cases than the second execution case, and
wherein the control structure includes at least one logical association between a trigger condition of the first group and a trigger condition of the third group such that the second group of one or more trigger conditions is selectively skipped depending upon values of the data being transformed;
means for receiving input data; and
means for checking trigger conditions of the control structure against the input data in a sequence determined using the control structure.

23. A method of executing an encoded rule set, the rule set defining a sequence of execution cases, wherein each execution case in the sequence of the execution cases is associated with one or more trigger conditions and an output to be produced when the one or more trigger conditions for a corresponding execution case are all satisfied, the method comprising, with a data processing system:
receiving input data;
checking trigger conditions of a control structure against the input data in a sequence determined using the control structure, wherein the control structure specifies:
a plurality of trigger conditions of the one or more trigger conditions associated with execution cases of the sequence of execution cases; and
logical associations between pairs of the plurality of trigger conditions that identify which of the plurality of trigger conditions to evaluate according to a logical result of evaluating a different one of the plurality of trigger conditions on values of the data being transformed,
wherein the control structure includes a first group of one or more trigger conditions associated with a first execution case, a second group of one or more trigger conditions associated with an execution case appearing later in the sequence of execution cases than the first execution case, and a third group of one or more trigger conditions associated with an execution case appearing later in the sequence of execution cases than the second execution case, and
wherein the control structure includes at least one logical association between a trigger condition of the first group and a trigger condition of the third group such that the second group of one or more trigger conditions is selectively skipped depending upon values of the data being transformed; and
storing and/or transmitting data based on an output specified by the control structure.

24. The method of claim 23, further including:
determining a logical sequence of the plurality of trigger conditions of the control structure based on execution times for the trigger conditions.

25. The method of claim 23, further including:
updating the execution time for a trigger condition in a list of unique trigger conditions based on the time it takes to execute the trigger condition with the input data; and
sorting pointers to trigger conditions in the control structure based on the updated execution time.

26. The method of claim 23, further including:
determining a logical sequence of the plurality of trigger conditions of the control structure based on failure rates for the trigger conditions.

27. The method of claim 23, further including:
updating a failure rate for a trigger condition in a list of unique trigger conditions based on whether the trigger condition is satisfied by a record in the input data; and
determining a logical sequence of the plurality of trigger conditions of the control structure based on the updated failure rate.

28. The method of claim 23, wherein the control structure is an acyclic directed graph with nodes corresponding to the plurality of trigger conditions and vertices corresponding to the logical associations between pairs of the plurality of trigger conditions.

29. At least one non-transitory computer readable medium comprising processor-executable instructions that, when executed, cause the at least one processor to:
encode a rule set for transforming data, the rule set defining a sequence of execution cases, wherein each execution case in the sequence of the execution cases is associated with one or more trigger conditions and an output to be produced when the one or more trigger conditions for a corresponding execution case are all satisfied, said encoding comprising:
generating a control structure, using the at least one processor, based at least in part on the rule set, the control structure specifying:
a plurality of trigger conditions of the one or more trigger conditions associated with execution cases of the sequence of execution cases; and
logical associations between pairs of the plurality of trigger conditions that identify which of the plurality of trigger conditions to evaluate according to a logical result of evaluating a different one of the plurality of trigger conditions on values of the data being transformed,
wherein the control structure includes a first group of one or more trigger conditions associated with a first execution case, a second group of one or more trigger conditions associated with an execution case appearing later in the sequence of execution cases than the first execution case, and a third group of one or more trigger conditions associated with an execution case appearing later in the sequence of execution cases than the second execution case, and
wherein the control structure includes at least one logical association between a trigger condition of the first group and a trigger condition of the third group such that whether trigger conditions of the second group of one or more trigger conditions are evaluated is selectively skipped based depending upon values of the data being transformed;
receive input data; and
check trigger conditions of the control structure against the input data in a sequence determined using the control structure.

30. The at least one non-transitory computer readable medium of claim 29, wherein the processor-executable instructions further cause the at least one processor to store and/or transmit data based on an output specified by the control structure.

31. The at least one non-transitory computer readable medium of claim 29, wherein at least one of the one or more trigger conditions associated with execution cases of the sequence of execution cases is not specified by the control structure.

32. The at least one non-transitory computer readable medium of claim 29, wherein the plurality of trigger conditions specified by the control structure consist of unique trigger conditions from the rule set.

33. The at least one non-transitory computer readable medium of claim 29, wherein the processor-executable instructions further cause the at least one processor to:
determine a logical sequence of the plurality of trigger conditions of the control structure based on execution times for the trigger conditions.

34. The at least one non-transitory computer readable medium of claim 29, wherein the processor-executable instructions further cause the at least one processor to:
update the execution time for a trigger condition in a list of unique trigger conditions based on the time it takes to execute the trigger condition with the input data; and
sort pointers to trigger conditions in the control structure based on the updated execution time.

35. The at least one non-transitory computer readable medium of claim 29, wherein at least two trigger conditions for an execution case in the rule set are combined and represented by a single trigger condition in the control structure.

36. The at least one non-transitory computer readable medium of claim 29, wherein at least two outputs for different execution cases in the rule set are combined and represented by a single output expression in the control structure.

37. The at least one non-transitory computer readable medium of claim 29, wherein the control structure is an acyclic directed graph with nodes corresponding to the plurality of trigger conditions and vertices corresponding to the logical associations between pairs of the plurality of trigger conditions.

* * * * *